United States Patent [19]
Chard et al.

[11] Patent Number: 5,809,280
[45] Date of Patent: Sep. 15, 1998

[54] ADAPTIVE AHEAD FIFO WITH LRU REPLACEMENT

[75] Inventors: Gary F. Chard, Tomball; William C. Galloway, Houston; Ryan A. Callison, Spring, all of Tex.

[73] Assignee: Compaq Computer Corporation, Houston, Tex.

[21] Appl. No.: 542,711

[22] Filed: Oct. 13, 1995

[51] Int. Cl.$^6$ ................................................. G06F 12/00
[52] U.S. Cl. .......................... 395/487; 395/473; 395/445; 395/250; 364/DIG. 1
[58] Field of Search .................................. 395/464, 310, 395/872; 365/221

[56] References Cited

U.S. PATENT DOCUMENTS

| | | | |
|---|---|---|---|
| 5,333,276 | 7/1994 | Solari | 395/287 |
| 5,371,870 | 12/1994 | Goodwin et al. | 395/872 |
| 5,450,546 | 9/1995 | Krakirian | 395/250 |
| 5,469,398 | 11/1995 | Scott et al. | 365/221 |
| 5,519,839 | 5/1996 | Culley et al. | 395/310 |
| 5,586,294 | 12/1996 | Goodwin et al. | 395/464 |

*Primary Examiner*—Tod R. Swann
*Assistant Examiner*—David C. Langjahr
*Attorney, Agent, or Firm*—Pravel, Hewitt, Kimball & Krieger

[57] ABSTRACT

A plurality of read-ahead FIFOs, each with an LRU replacement policy, is provided for enhancing buffer performance. The FIFO contains a plurality of adaptive buffer replacement counters to monitor usage statistics of the FIFOs and to identify one of the FIFOs as a refill candidate buffer in the event of a miss which requires new data to be brought into one of the FIFOs. Each FIFO has a hit detector and a flush detector for comparing the address of a data request from the bus master with the address stored by each buffer for indicating FIFO hit or invalidate operations. Each FIFO also has a buffer selector to provide data from the buffer selected by the hit detector to the bus master if the selected FIFO buffer has not been invalidated by the invalidate address comparator. The buffer selector otherwise transferring the requested data from the memory to the refill candidate buffer and presenting new data from the refill candidate buffer to the bus master. The FIFO has an invalidate address comparator coupled to the memory and the FIFOs to compares write addresses to the memory with each address of each FIFO to invalidate the FIFO buffer whose address tag matches the invalidate address to ensure data coherency.

33 Claims, 23 Drawing Sheets

ADAPTIVE AHEAD FIFO WITH LRU REPLACEMENT

BACKGROUND OF THE INVENTION

1. Field of the Invention

The invention relates in general to a data buffer and, more particularly, to an adaptive read-ahead first-in-first-out (FIFO) buffer.

2. Description of the Related Art

The rapid rate of innovation in processor engineering has resulted in an impressive leap in performance from one CPU generation to the next. While the processing capability of the computer system has increased tremendously, the input/output (I/O) speed of secondary storage devices such as disk drives has not kept pace. Whereas the processing performance is largely related to the speed of its electronic components, disk drive I/O performance is dominated by the time it takes for the mechanical parts of the disk drives to move to the location where the data is stored, known as a seek and rotational times. On the average, the seek or rotational time for random accesses to disk drives is an order of magnitude longer than the data transfer time of the data between the processor and the disk drive. Thus, a throughput imbalance exists between the processor and the disk system.

To minimize this imbalance, the prior art disk system typically uses a disk cache to buffer the data transfer between the host processor and the disk drive. The disk cache reduces the number of actual disk I/O transfers since there is a high probability that the data accessed is already in the faster disk cache. Hence, the overall I/O performance is improved because the disk cache increases the ratio of relatively fast cache memory accesses to the relatively slow disk I/O access.

In more sophisticated disk systems, performance may be further increased by placing a FIFO buffer between the cache memory and the bus master to facilitate block transfers from the disk cache memory to a requesting bus master. However, in a multi-tasking computer system where the bus master alternately processes different threads of the same or different applications, the refilling policy of the FIFO buffer can have a significant impact on the overall buffer performance. With a simplistic refill policy where the FIFO buffer contains only the data block last requested, a multitude of requests over a variety of disk files can easily exhaust the capability of the FIFO buffer to retain the desired data in its buffer. Data that would be reused in the near future by one process may be flushed prematurely to make room for handling new requests from another process. As a result, the FIFO buffer constantly refills and swaps data from one process to the next, which increases the number of accesses to the disk cache and thus reduces the availability of the disk cache. Thus, a simple mapping of the FIFO to the last block of data accessed from the disk cache may not achieve the desired performance over a wide range of applications. Hence, a need exists for an improved data buffer between the disk cache and the processor to minimize the performance disparity between the processor and the disk system and to optimize overall processing throughput.

SUMMARY OF THE INVENTION

The present invention buffers data requests from a consumer, or a bus master, to a memory using a plurality of read-ahead FIFOs, each of which uses an adaptive replacement policy. Each FIFO has a buffer for storing a data block from the memory and an address associated with the data block. Each FIFO has a hit detector connected between the FIFOs and the bus master for receiving the address of the data request from the bus master and comparing the address of each of the buffers with the address of the bus master data request. The hit detector asserts a hit output corresponding to one of said buffers if the request from the bus master is contained in said buffers. Each FIFO also has a flush detector which causes the buffer selected by the hit detector to be flushed if the buffer has been invalidated by the invalidate address comparator.

The present invention also contains a plurality of adaptive buffer replacement counters, each of the counters respectively coupled to each FIFO to monitor usage statistics of the FIFOs. Based on the usage statistics, the adaptive buffer replacement counters identify one of the FIFOs as a refill candidate buffer. Each FIFO further has a buffer selector coupled to the buffers, the hit detector, the flush detector and the counters. The buffer selector provides data from the buffer containing the hit to the bus master if the FIFO containing the hit buffer has not been invalidated by the invalidate address comparator. Otherwise, the buffer selector transfers the requested data from the memory to the refill candidate buffer and then provides data from the refill candidate buffer to the bus master.

Upon reset, the FIFOs are invalidated. Thus, initial requests from the bus masters cause the FIFOs to be flushed and filled in turn. The FIFO fill operation is controlled by a least recently used algorithm, which selects the FIFO least recently used. If a hit occurs, the FIFO selected is the FIFO containing the requested data. This particular FIFO is placed on the bottom of the least recently used stacked after the connection to the bus slave channel has been terminated by the requesting bus master.

Additionally, accesses to the DRAM controller are locked through the bus slave channel to ensure coherency. While the bus slave is inactive, the LRU block snoops the writes to the DRAM controller to determine if any invalidation cycles to the plurality of FIFO's are necessary. The FIFO has an invalidate address comparator coupled to the memory controller to compare the memory write address with the address of the data block buffered by the FIFO. The FIFO buffer bearing the address that matches the memory write address is invalidated.

In the event that a data request by the currently active bus master or thread does not result in a hit to any of the FIFOs, the least recently used FIFO is selected as a candidate for replacement purposes. As such, data belonging to requests by other bus masters or threads that are recently used are preserved to be reused in the near future by the next bus master or thread. As data belonging to inactive processes are not flushed prematurely to make room for handling requests from the current bus master or thread, each of the plurality of FIFOs are effectively assigned to a different bus master or thread, resulting in improvements in the overall data buffer performance in a multi-bus master or multi-tasking environment.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
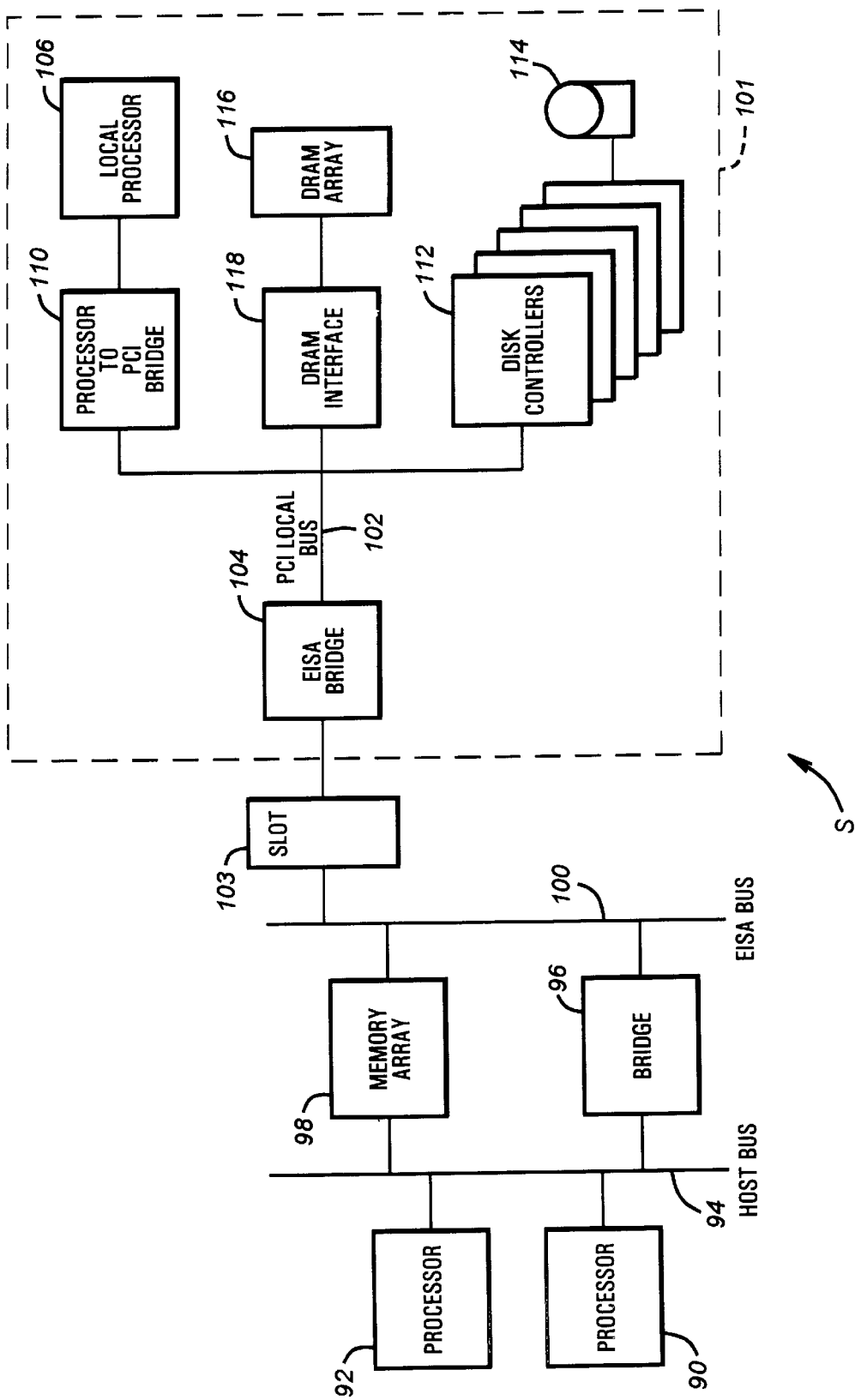
FIG. 1 is a block diagram of a computer system including a disk array system containing the adaptive read-ahead buffer of the present invention.

Turning to the drawings, FIG. 1 discloses a block diagram of a computer system S having an intelligent disk array system 101 containing adaptive read-ahead FIFOs. For purposes of illustration only, and not to limit generality, the invention will be described with reference to its operation within a disk array system.

The computer system S has a plurality of host processors 90 and 92. These host processors are connected to a host bus 94. The host bus 94 is a relatively high speed bus in comparison with a peripheral bus 100, preferably an EISA bus, which is provided to interface the system S with a plurality of peripherals. A memory array 98 is positioned between the host bus 94 and the EISA bus 100. Additionally, a host bus to EISA bus bridge 96 is placed between the two buses to transfer data from one bus to the other. The EISA bus has one or more slots 103, upon which the disk array system is connected to. Although the bus 100 is illustrated as being an EISA bus, it may alternatively be a PCI bus, or any other suitable buses.

During the operation of the computer system, the bus master issues I/O requests, such as disk read and write requests, to the intelligent disk array system 101 to request that data be transferred over the EISA bus 100. The EISA bus 100 is connected to an EISA bridge 104, which is connected to the disk array system via a PCI local bus 102. The dual bus hierarchy of FIG. 1 allows for concurrent operations on both buses. The EISA bridge 104 also performs data buffering which permits concurrency for operations that cross over from one bus into another bus. For example, an EISA device could post data into the bridge 104, permitting the PCI local bus transaction to complete independently and freeing the EISA bus 100 for further transactions.

The PCI local bus 102 is further connected to a processor to PCI bridge 110. The other side of the processor to PCI bridge 110 is connected to a local processor 106 which oversees the operation of the intelligent disk array system 101, including the caching of the disk data, among others. The processor to PCI bridge 110 interfaces the local processor 106 to the local PCI bus 102 to provide host access to the local processor support functions and to enable the local processor to access resources on the PCI bus 102. The bridge 110 performs a number of functions, including interrupt controls, local processor DRAM interfacing, and decoding for the local processor ports, among others.

The PCI local bus 102 is also connected to a DRAM interface 118, which in turn is connected to a DRAM memory array 116. The DRAM interface 118 and the DRAM memory array 116 can support either a 32 or a 64-bit data path with a parity protected interface and/or an 8-bit error detection and correction of the DRAM array data. The DRAM array 116 provides a buffer which can serve, among others, as a disk caching memory to increase the system throughput. In addition to supporting the DRAM array 116, the DRAM interface 118 supports three hardware commands essential for drive array operations: memory to memory move operation, zero fill operation and zero detect operation. The memory to memory move operation moves data from system memory 98 to a write cache located in the DRAM array 116 during write posting operations. Also, on cache hits to previously posted data still residing in cache, a bus master in the DRAM interface 118 is programmed to move the data in the write cache to the system memory 98. Further, the movement of data located within the DRAM array 116 is supported by the DRAM interface 118. The second hardware command supporting drive array operations is a zero-fill command, which is used to initialize the XOR buffer for RAID 4 and 5 operations. Finally, the DRAM interface bus master supports a zero detect operation, which is used in RAID 1, RAID 4, and RAID 5 operations to check redundant disk data integrity.

The PCI local bus 102 is also connected to one or more disk controllers 112 which is further connected to a plurality of disk drives 114. Each of the plurality of disk controllers 112 is preferably configured for a small computer systems interface (SCSI) type interface and operate as PCI bus masters. As shown in FIG. 1, the local processor 106 may, through the processor to PCI bridge 110, access the DRAM array 116 via the DRAM interface 118 or the disk drives 114 via the disk controllers 112. Similarly, a host processor can, through the EISA bus 100 and through the EISA bridge 104, access the PCI local bus 102 to communicate with the processor to PCI bridge 110, the DRAM interface 118, or the disk controllers 112 to acquire the necessary data.

Figure 2:
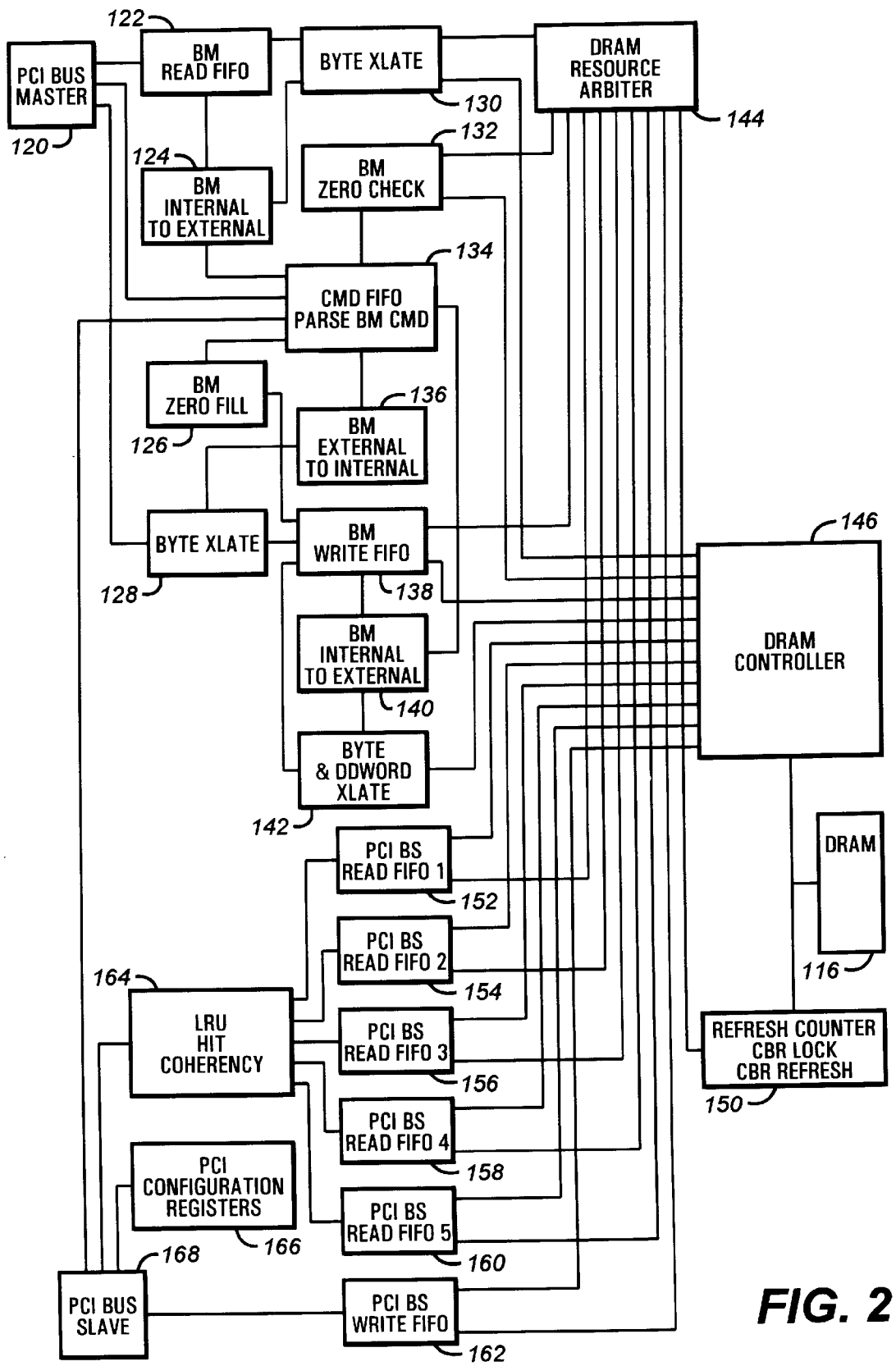
FIG. 2 is a block diagram of the DRAM interface of FIG. 1.

FIG. 2 shows in more detail the DRAM interface 118. In the upper portion of FIG. 2, a PCI bus master 120 is connected to a bus master read FIFO 122 which buffers data to the bus master. The bus master 120 is also connected to a command FIFO 134 which accepts and parses commands for operation by the bus master. The bus master 120 is further connected to a byte translate block 128 which performs byte alignment based on source and destination address differences. A bus master internal to external move controller 124 is connected to the bus master read FIFO 122 and to a second byte translate block 130. The bus master internal to external move controller 124 handles operations where data is transferred to host memory 98 from the internal DRAM array 116. The bus master internal to external move controller 124 is connected to the command FIFO 134 to receive operational control. The outputs of the byte translate block 130 are connected to a DRAM resource arbiter 144 and a DRAM controller 146 to enable the bus master 120 to directly access the DRAM array 116.

The command FIFO block 134 is also connected to control a bus master zero fill block 126, which in turn is connected to a bus master write FIFO 138. The command FIFO block 134 is also connected to control a bus master zero check block 132 which is connected to the DRAM resource arbiter 144 and the DRAM controller 146. The zero fill block 126 supports the zero-fill command, which is used to initialize an XOR buffer in memory to zero values for RAID 4 and 5 operations. The zero check block 132 supports the zero detect operation, which is used in RAID 1, RAID 4, and RAID 5 operations to check redundant disk data integrity.

To support the memory move commands inside the DRAM array 116, the command FIFO block 134 is connected to a bus master internal to internal move controller 140. The internal to internal move controller 140 handles transfers from one location in the DRAM array 116 to another location in the DRAM array 116. The command FIFO block 134 also controls a bus master external to internal move controller 136, which controller 136 transfers data from host memory 98 to the internal DRAM array 116. The byte translate block 128 is connected to the bus master external to internal controller 136 as well as the bus master write FIFO 138. The bus master write FIFO 138 is connected to a byte and double word translate block 142 as well as the bus master internal to internal move controller 140. The internal to internal move controller 140 is connected to the byte and double word translate block 142, whose output is connected to the DRAM controller 146. The bus master write FIFO 138 is connected to the DRAM controller 146, and the DRAM resource arbiter 144 for buffering and translating the data transfers between the bus master 120 and the DRAM array 116. Thus the described circuits facilitate the transfer of data between the DRAM array 116 and the bus master 120.

The lower portion of FIG. 2 shows in more detail a block diagram of a PCI bus slave. In FIG. 2, a PCI bus slave 168 is connected to the command FIFO block 134, a least recently used (LRU) hit coherency block 164, a plurality of PCI configuration registers 166 and a PCI bus slave write FIFO 162. Collectively, the LRU hit coherency block 164 and FIFOs 152–162 form an adaptive read-ahead buffer 151. The PCI bus slave write FIFO 162 is a speed matching FIFO that allows for the posting of writes by the bus slave 168.

The PCI configuration registers 166 are registers for storing the configuration of the DRAM interface 118. These registers contain information such as vendor identification, device identification, command, status, revision identification, class code, cache line size, I/O register map base address, memory register map base address, DRAM memory base address, DRAM configuration register, and refresh counter initialization settings, among others.

The LRU hit coherency block 164 provides a local script fetching mechanism which effectively provides a read ahead coherent cache to minimize the wait time on the disk controllers 112 when fetching instructions or data from the DRAM array 116. The LRU hit coherency block 164 is connected to a plurality of bus slave read FIFOs 152–160. Each of the read FIFOs 152–160 is in turn connected to the DRAM resource arbiter 144 and the DRAM controller 146. Upon a read hit, data from the read FIFOs can be immediately provided to the bus slave 168 to improve system throughput. In the event of a read miss, the FIFO buffer follows an adaptive replacement policy, preferably the least recently used algorithm, to ensure optimal performance in multi-threaded applications. To ensure coherency of the data stored in the read FIFOs, all memory accesses are locked to the DRAM controller 146 through the PCI bus slave 168. Thus, as long as a PCI bus master is connected to the PCI bus slave 168, all writes to the DRAM memory array 116 will be blocked to ensure coherency of information associated with the read FIFOs during the slave transfer. Further, any time the bus slave 168 is inactive, the LRU block 164 snoops writes to the DRAM controller 146 to determine if invalidation cycles to the read FIFOs 152–160 are needed.

The refresh counter 150 provides various refresh cycles to the DRAM array 116, including CAS BEFORE RAS (CBR) refresh cycles. The CBR refresh cycles are stacked two-deep such that a preemption of an on-going access occurs only when that cycle is at least two refresh periods long. The refresh counter block 150 is also connected to the DRAM resource arbiter 144 to ensure that the refresh cycles to the DRAM array 116 are not untimely delayed.

The DRAM resource arbiter 144 controls all requests to access the DRAM. The resource arbiter 144 provides the highest priority to requests from the CBR refresh counter block 150, followed by requests from the bus slave write FIFO 162, followed by requests from the read FIFO banks 152–160, and finally requests from the bus master command FIFO 134.

The CP FIFO register is located in the command pointer FIFO 134 and may be accessed by a bus master via the PCI bus slave 168, which connects with the command FIFO block 134 to provide a communication channel between the bus master and the controller. The CP FIFO register has a read access mode in which the remaining data words that can be written into the FIFO are provided. It also has a write access mode where the address of the next CDB or command pointer can be inserted into the FIFO 134. The value read from the command pointer FIFO register indicates the number of command pointers that can be accepted by the controller: a value of zero from the CP FIFO register indicates that the CP FIFO 134 is full and that the CP FIFO 134 will not accept another command pointer, while a non-zero value from the CP FIFO register indicates that the bus master can submit that many command pointers consecutively without having to read the FIFO 134 to verify the availability of space in the FIFO 134. Consequently, the CP FIFO register should be read before submitting the first command and before each time the number of consecutive CDB submissions equals the value last status read from the CP FIFO register.

In addition, when the CP FIFO register is read, the FIFO remaining count indication is latched and subsequent writes to the CP FIFO register will not update the memory of the CP FIFO 134 unless the previous read of the CP FIFO register indicated that the CP FIFO 134 is not full and can accept another command pointer.

A second FIFO called a command completion pointer (CCP) FIFO provides a channel for the bus master to receive notifications of a completed command list from the intelligent disk array system. The CCP FIFO can preferably hold up to sixteen double words, each of which is the address of an individual command list that has been completed by the controller. When read, the CCP FIFO register will either return the address of a completed command list or a value of zero. A value of zero indicates that none of the requested commands has been completed at the time of the status read. When a non-zero value is read from this register, the value returned is the address of a completed command list.

Figure 3:
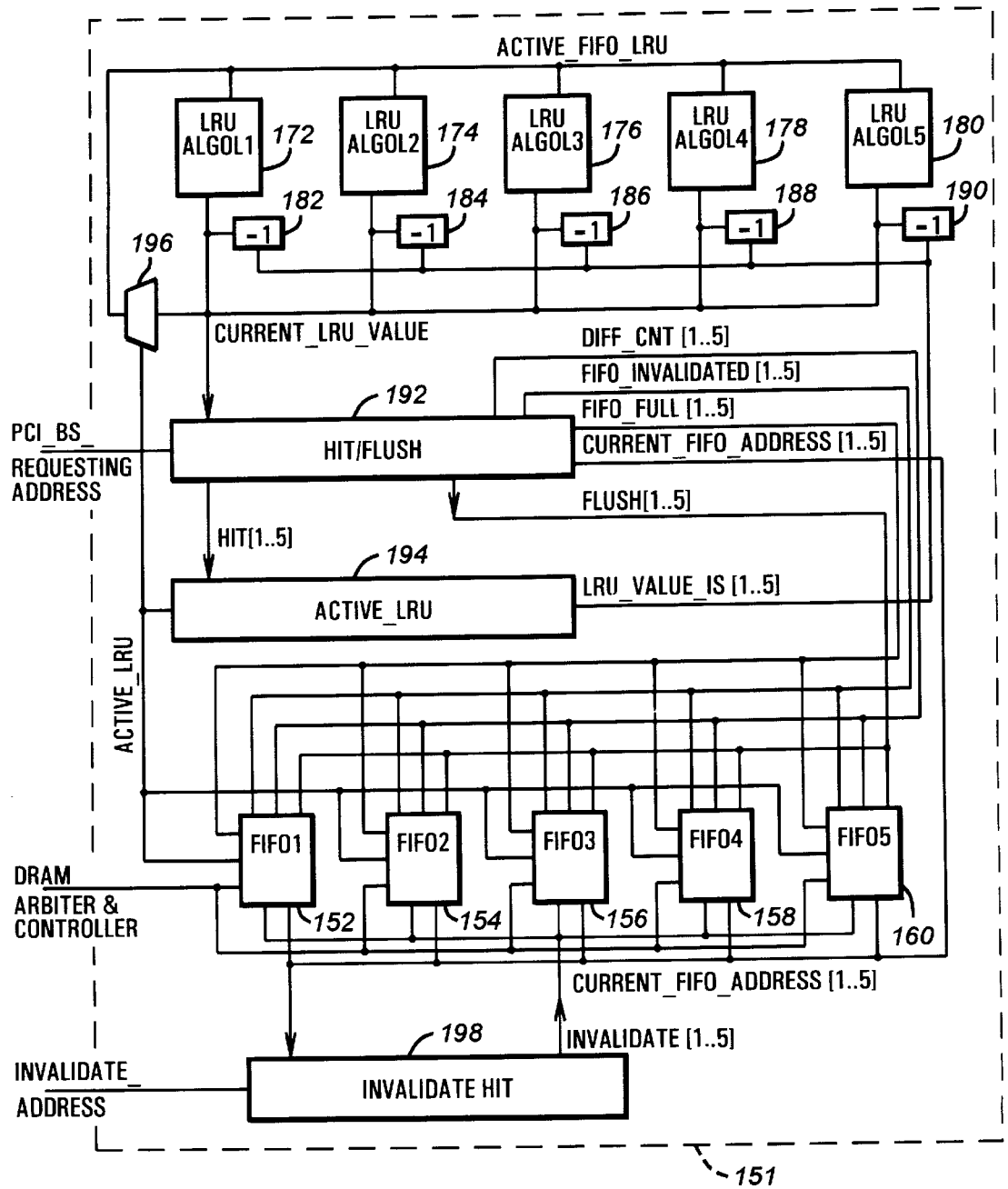
FIG. 3 is a block diagram of the adaptive read-ahead buffer in the DRAM interface of FIG. 2.

Turning to FIG. 3, a block diagram of the adaptive read-ahead buffer 151 is shown in more detail. A plurality of LRU algorithm modules 172–180 are connected to a hit/flush module 192. The LRU algorithm modules 172–180 track the LRU ranking of each of the corresponding FIFOs 152–160. The outputs of the LRU algorithm modules 172–180 are individually connected to a plurality of unity comparators 182–190 which detects the FIFO with an LRU ranking value of one as the next candidate to be swapped out and refilled. The outputs of the unity comparators 182–190 are connected to the inputs of an active LRU module 194 which maintains an active LRU value to point to the active buffer. The hit/flush module 192 is also connected to the active LRU module 194. The hit/flush module 192 is further connected to the plurality of FIFOs 152–60, to the active LRU module 194 and to an invalidate hit module 198. The LRU hit coherency block 164 snoops write operations to the DRAM controller 146 and causes the appropriate FIFO buffer to be invalidated. The output of the active LRU module 194 is also presented to a multiplexer 196 which provides the next LRU value to the LRU algorithm modules 172–180, based on the output from the active LRU module 194.

During operation, each of the LRU algorithm modules 172–180 tracks the least recently used statistics for the corresponding FIFOs 152–160. The LRU algorithm modules 172–180 monitor usage statistics and generate a count indicative of the recent usage for each of the corresponding FIFOs 150–160. In the preferred embodiment, an LRU value of one indicates that the FIFO is the least recently used, while the LRU value of five preferably indicates that the FIFO is the most recently used FIFO. When the output of one of the LRU algorithm modules 172–180 reaches one, one of the corresponding unity comparators 180–190 indicates that its corresponding FIFO is the least recently used FIFO for refilling purposes.

In addition to storing data, each of the FIFOs 152–160 also tracks an address associated with the data stored in the FIFO. The address is provided to the hit/flush module 192 and the invalidate hit module 198. The invalidate hit module 198 compares the FIFO address with the invalidate address provided from the DRAM controller 146 and, if a match exists, invalidates the corresponding FIFOs 150–160. Similarly, each FIFO address is compared with a requesting address from the PCI bus slave PCI_BS_REQUESTING_ADDRESS via the bus slave interface to generate hit and flush signals corresponding for each of the FIFOs 150–160. Each of the FIFOs 150–160 provides DIFF_CNT and ACCURATE_DIFF_CNT to the hit/flush module 192 to indicate the remaining storage capacity of each of the FIFOs 162–160. In addition, each of the FIFOs 150–160 provides FIFO FULL and FIFO_INVALIDATED signals to the hit/flush module 192.

Upon reset, all FIFOs 150–160 are invalidated, and initial data requests cause the FIFOs 150–160 to be filled in turn. Once the data requests have filled the FIFOs 150–160, the FIFO fill operation is controlled by the LRU algorithm modules 172–180 which selects the least recently used FIFO from the FIFOs 150–160, as flagged by the unity comparators 180–190, for filling purposes.

On a read-miss, the least recently used FIFO is filled with the requested data from the DRAM 116. Data from the filled LRU FIFO is then provided to the consumer or the bus master. Alternatively, on a read-hit, data is provided directly from the FIFO containing the requested data to the consumer, or bus master 90. The corresponding LRU algorithm module 172–180 is updated to reflect the recent usage statistic of the FIFO with the read-hit. Further, the invalidate hit module 198 of the adaptive read-ahead buffer monitors or snoops write operations to the DRAM controller 146 to determine whether or not the FIFOs 150–160 need to be invalidated in the event that the corresponding locations in the memory 116 has been written as the copy of the data is no longer correct. As the FIFOs 150–160 keep the most recently used data and discard the least recently used data, the overall hit ratio of the adaptive read-ahead buffer is enhanced. The operation of the individual modules in providing a multi-threaded read-ahead FIFO using an LRU algorithm so that each FIFO is effectively assigned to a different thread is explained in more detail below.

Figure 4:
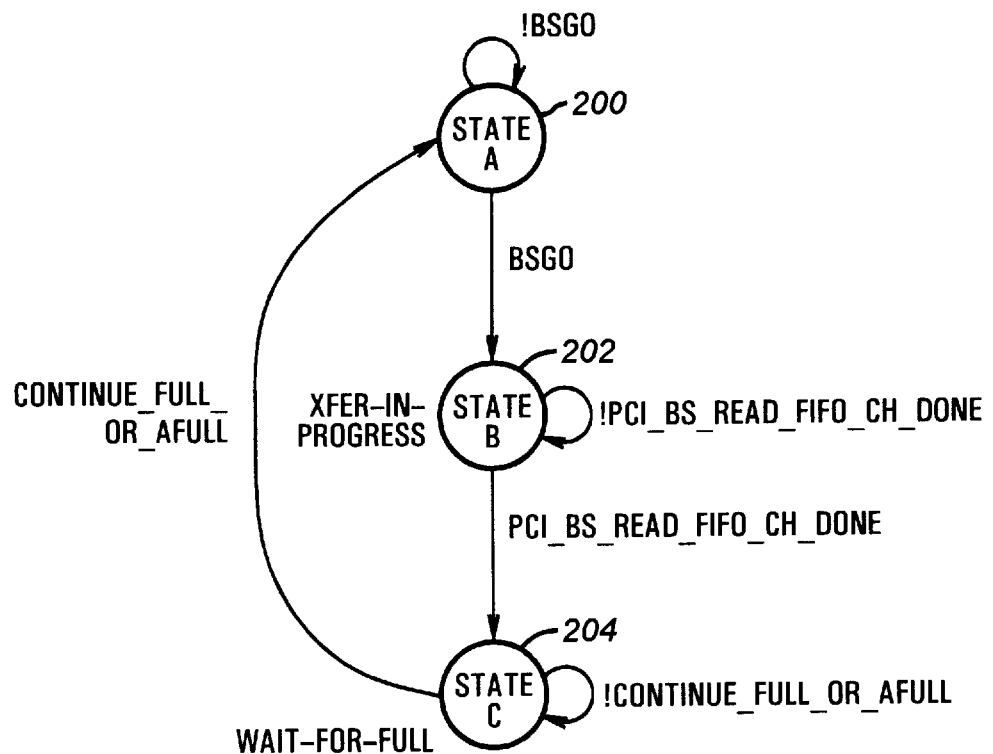
FIG. 4 is a state machine of the adaptive read-ahead buffer.

Turning to FIG. 4, the state machine for the LRU hit coherency block 164 is disclosed. The machine of FIG. 4 has three states: an idle state STATE_A 200, a transfer-in-progress state STATE_B 202, and a wait-for-full state STATE_C 204. Upon reset, the state machine enters the idle state STATE_A 200 and remains in STATE_A 200 until BSGO is asserted. BSGO is a signal controlled by the bus master which has requested data transfer from the DRAM array 116. Upon the assertion of BSGO, the state machine transitions to the STATE_B indicating that a transfer is in progress. The state machine remains in STATE_B 202 until the bus master signals the completion of its request via PCI_BS_READ_FIFO_CH_DONE. Upon receipt of PCI_BS_READ_FIFO_CH_DONE, the machine transitions to STATE_C 204 where the machine waits for the completion of the block data transfer from the DRAM 116 into the FIFO by waiting for a full signal from the FIFO, as indicated by CONTINUE_FULL_OR_AFULL. Upon receipt of CONTINUE_FULL_OR_AFULL, the state machine transitions from state 204 back to STATE_A 200 where the entire cycle can begin anew.

Figure 5:
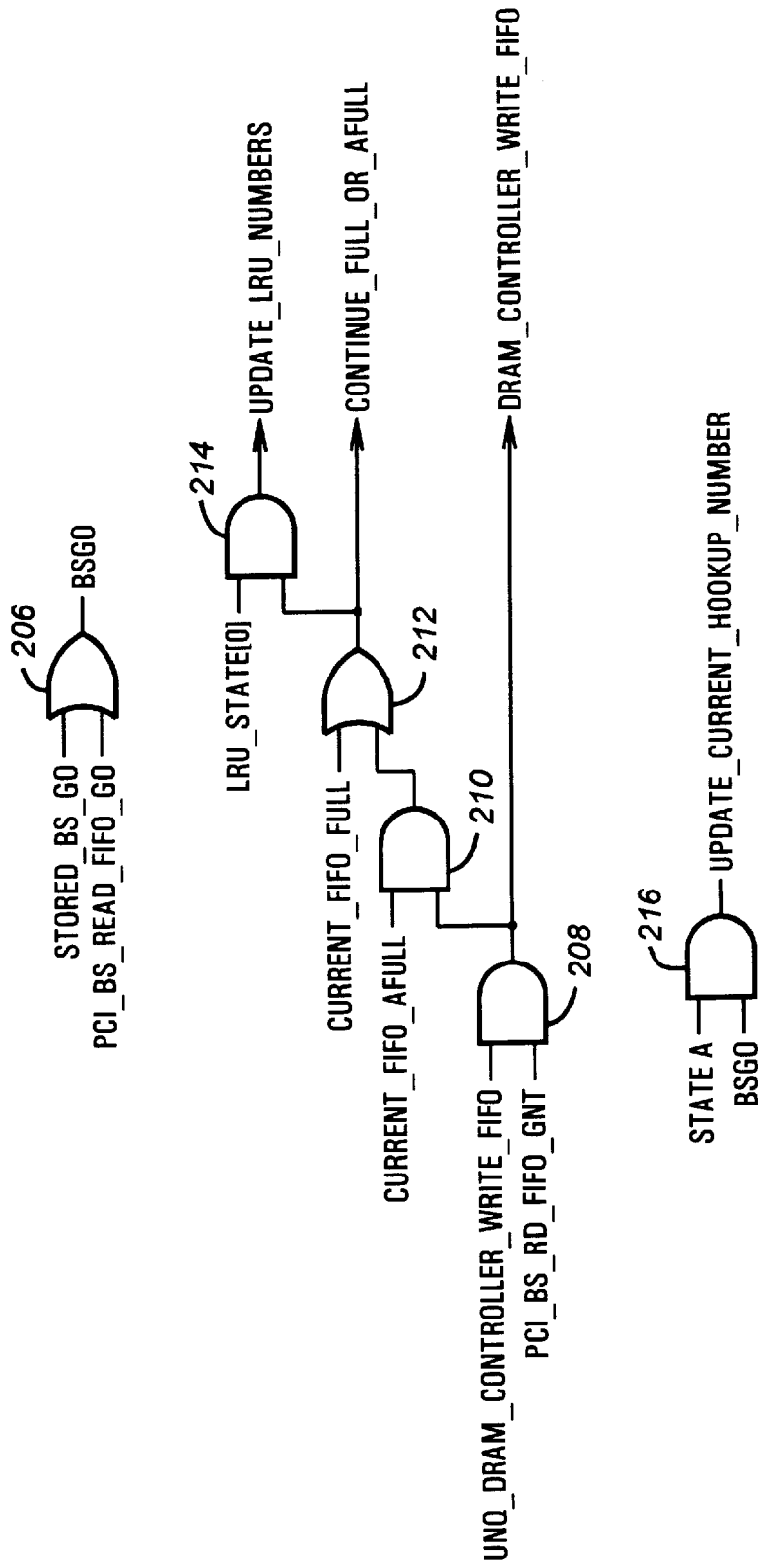
FIG. 5 is a schematic diagram of support circuits used in conjunction with the state machine of FIG. 4.
Figure 7:
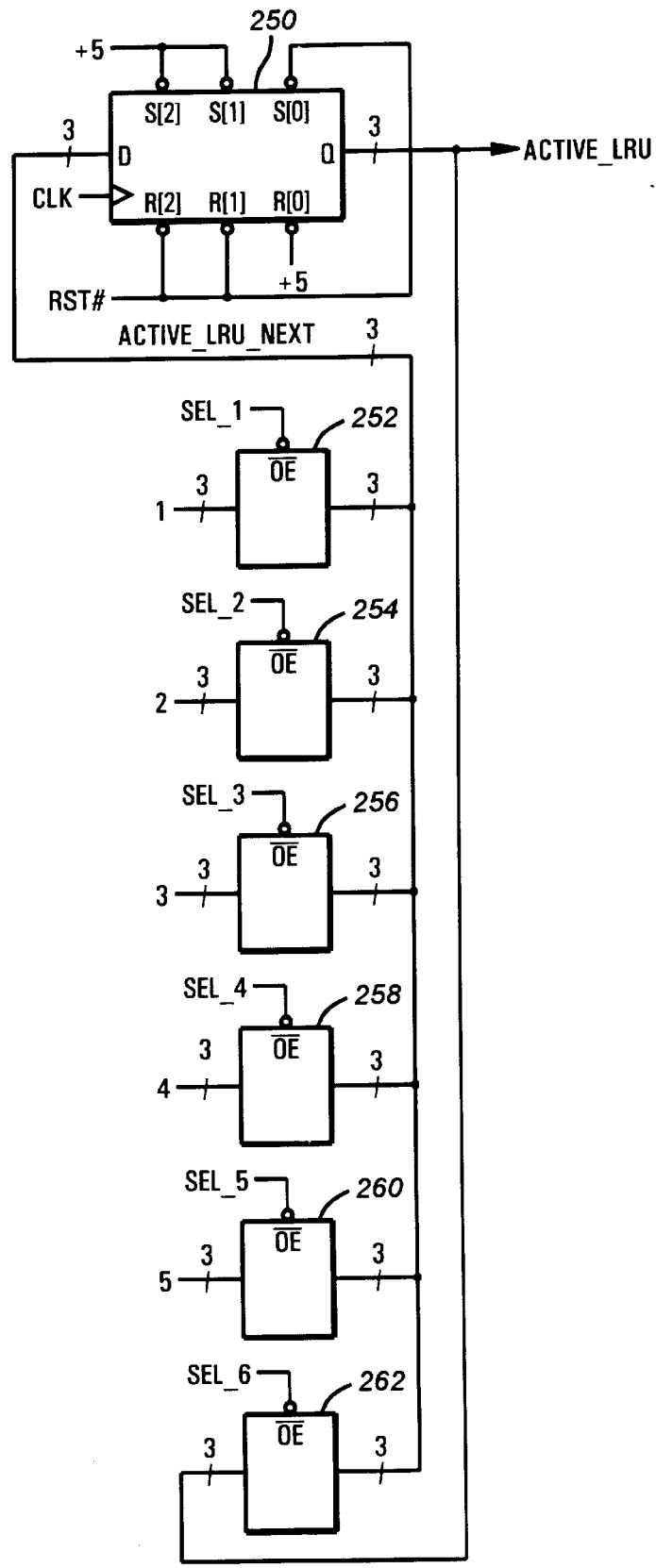
FIG. 7 is a block diagram of an active LRU tracker of the adaptive read-ahead buffer.

In FIG. 5, the circuits for generating the signals used by the state machine of FIG. 4 are disclosed. As shown in FIG. 5, BSGO is generated by OR'ing STORED_BS_GO with PCI_BS_READ_FIFO_GO via an OR gate 206. STORED_BS_GO, disclosed in more detail in FIG. 7, is a latched version of a signal indicating that a PCI bus master was accessing the PCI bus slave 168. PCI_BS_READ_FIFO_GO is a signal generated when a bus master requests read access to the FIFO via the bus slave interface.

The next block in FIG. 5 generates UPDATE_LRU_NUMBERS, CONTINUE_FULL_OR_AFULL, and DRAM_CONTROLLER_WRITE_FIFO. DRAM_CONTROLLER_WRITE_FIFO is generated by an AND gate 208 whose inputs are UNQ_DRAM_CONTROLLER_WRITE_FIFO and PCI_BS_RD_FIFO_GNT. UNQ_DRAM_CONTROLLER_WRITE_

FIFO is an unqualified write signal from the DRAM controller 146 to all FIFOs 150–160. This signal is subsequently decoded to generate individual FIFO write signals. PCI_BS_RD_FIFO_GNT is a signal from the DRAM resource arbiter 144 granting the request by one of the FIFOs to access the DRAM array 116. DRAM_CONTROLLER_WRITE_FIFO is provided to an AND gate 210, whose other input is CURRENT_FIFO_AFULL, a signal indicating that the currently selected FIFO is almost full. The output of the AND gate 210 is provided to an OR gate 212 whose other input is CURRENT_FIFO_FULL, a signal indicating that the currently selected FIFO is full. The output of the OR gate 212 is CONTINUE_FULL_OR_AFULL. This signal is provided to one input of an AND gate 214, whose other input is bit 0 of the LRU_STATE vector signifying STATE_C 204, to generate UPDATE_LRU_NUMBERS which causes the LRU values to be updated.

Additionally, BSGO is connected to one input of an AND gate 216. STATE_A 200 is connected to the other input of the AND gate 216 to generate UPDATE_CURRENT_HOOKUP_NUMBER, a signal used to update the active LRU module 194.

Figure 6:
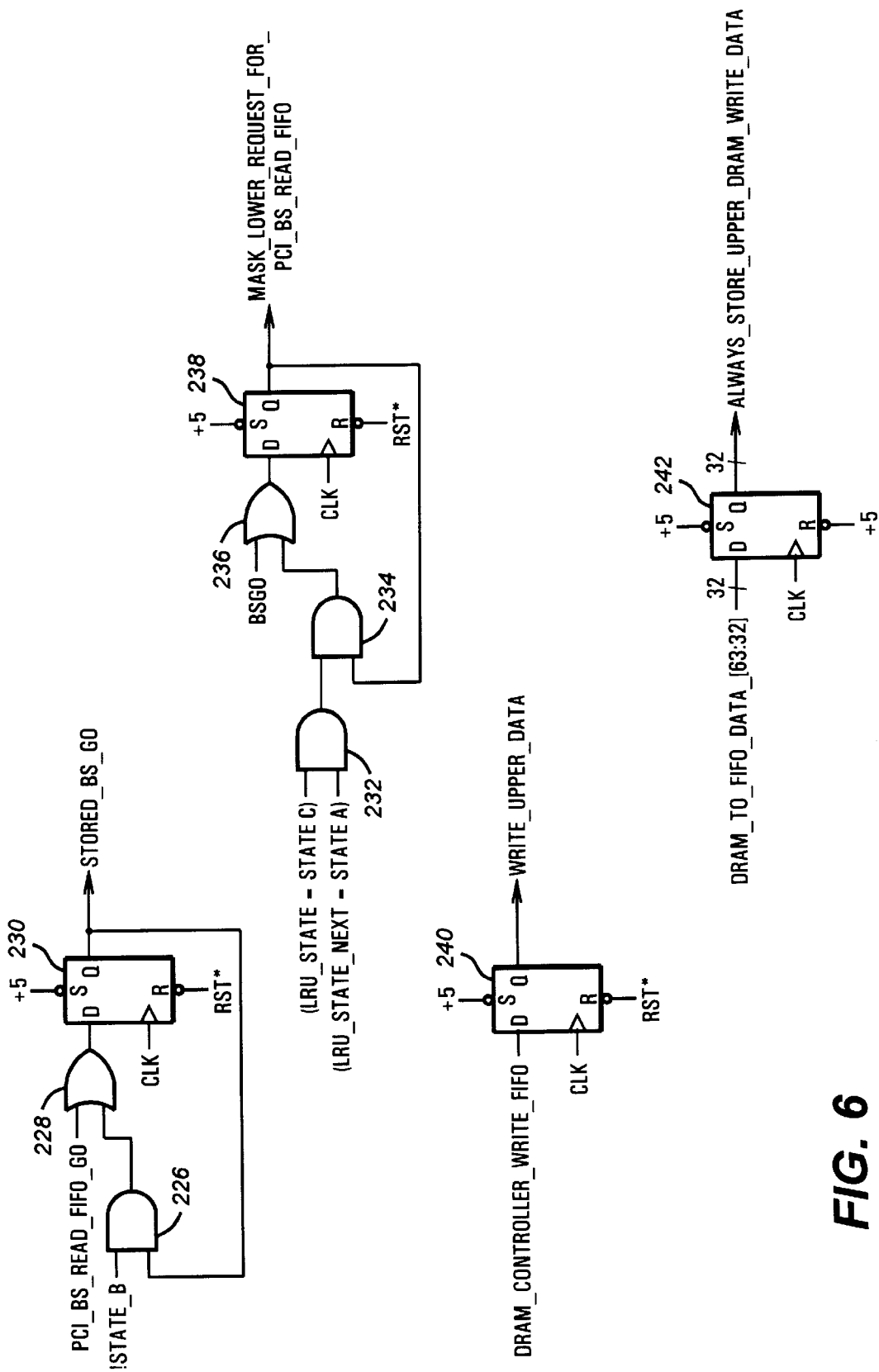
FIG. 6 is a plurality of circuits used in the adaptive read-ahead buffer.

Turning to FIG. 6, the circuits for updating STORED_BS_GO, MASK_LOWER_REQUEST_FOR_PCI_BS_READ_FIFO, WRITE_UPPER_DATA, and ALWAYS_STORE_UPPER_DRAM_WRITE_DATA are disclosed. As explained earlier, STORED_BS_GO is a latched version of BSGO indicating that the PCI bus master was requesting data from the PCI bus slave. STORED_BS_GO is latched by a flip-flop 230 to capture an access from the bus master when PCI_BS_READ_FIFO_GO is asserted, or when the state machine of FIG. 4 is not in STATE_B 204 and STORED_BS_GO is asserted as AND'd by an AND gate 226. The output of the AND gate 226 is OR'd with PCI_BS_READ_FIFO_GO via an OR gate 228 whose output is provided to the input of the flip-flop 230. The flip-flop 230 is clocked by a clock signal CLK.

MASK_LOWER_REQUEST_FOR_PCI_BS_READ_FIFO, stored by a flip-flop 238, is a part of the priority scheme whereby the FIFOs 150–160 are given the highest priority by the DRAM resource arbiter 144. Upon the assertion of MASK_LOWER_REQUEST_FOR_PCI_BS_READ_FIFO, other devices requesting access to the DRAM array 116 will be blocked out, ensuring that the FIFOs 150–160 have the highest level of service from the DRAM array 116. In generating MASK_LOWER_REQUEST_FOR_PCI_BS_READ_FIFO, an AND gate 232 checks for the condition when the current LRU state is STATE_C 204 and when the next LRU state is equal to STATE_A 200. The output of AND gate 232 is provided to an AND gate 234, whose other input is the current value of MASK_LOWER_REQUEST_FOR_PCI_BS_READ_FIFO. The output of the AND gate 234 is provided to an OR gate 236, whose other input is BSGO. The output of the OR gate 236 is provided to the D input of a flip-flop 238 to generate MASK_LOWER_REQUEST_FOR_PCI_BS_READ_FIFO. The flip-flop 238 is clocked by CLK. Thus, when the FIFO is finishing filling up one FIFO, the FIFO fill operation retains priority over other requesters.

In FIG. 6, WRITE_UPPER_DATA is stored in a flip-flop 240 whose input is DRAM_CONTROLLER_WRITE_FIFO. WRITE_UPPER_DATA thus delays the 64-bit write one clock period to enable the upper 32-bit half to be written in the second clock period. In addition, a plurality of flip-flops 242 is used to latch the upper 32 bits of DRAM_TO_FIFO_WRITE_DATA bus and output them as ALWAYS_STORE_UPPER_DRAM_WRITE_DATA bus. WRITE_UPPER_DATA and ALWAYS_STORE_UPPER_DRAM_WRITE_DATA are eventually used as part of the 64 to 32-bit conversion and data assembly circuitry. Here, the 64-bit of data from the DRAM array 116 is presented to the FIFO, which instead of storing 64-bits of data at once, breaks the data into two 32-bit segments and stores the lower data segment first and the other 32-bit segment second.

Turning to FIG. 7, the active LRU module 194 is disclosed in more detail. The module 194 tracks which of the FIFOs 150–160 is the currently active via an active LRU value. The active LRU value is stored by a plurality of flip-flops 250. These flip-flops are preconfigured so that upon the assertion of the reset signal RST*, the active LRU value points to FIFO 1 as the active least recently used FIFO. The plurality of flip-flops 250 is connected to a plurality of buffers 252–262, each of whom is preconfigured to drive ACTIVE_LRU_NEXT bus with values preferably ranging from 1–5 to point to one of the five FIFOs 150–160. The flip-flops 250 are clocked by CLK. The equations to enable the outputs of buffers 252–262 are as follows:

```
SEL_1 =  UPDATE_CURRENT_HOOKUP_NUMBER · !HIT · LRU_IS_1 +
         UPDATE_CURRENT_HOOKUP_NUMBER · HIT · HIT_1

SEL_2 =  UPDATE_CURRENT_HOOKUP_NUMBER · !HIT · LRU_IS_2 +
         UPDATE_CURRENT_HOOKUP_NUMBER · HIT · !HIT_1 + HIT_2

SEL_3 =  UPDATE_CURRENT_HOOKUP_NUMBER · !HIT · LRU_IS_3 +
         UPDATE_CURRENT_HOOKUP_NUMBER · HIT · !HIT_1 · !HIT_2 · HIT_3

SEL_4 =  UPDATE_CURRENT_HOOKUP_NUMBER · !HIT · LRU_IS_4 +
         UPDATE_CURRENT_HOOKUP_NUMBER · HIT · !HIT_1 · !HIT_2 · !HIT_3 · HIT_4

SEL_5 =  UPDATE_CURRENT_HOOKUP_NUMBER · !HIT · LRU_IS_5 +
         UPDATE_CURRENT_HOOKUP_NUMBER · HIT · !HIT_1 · !HIT_2 · !HIT_3 · !HIT_4 ·
         HIT_5

Figure 10:
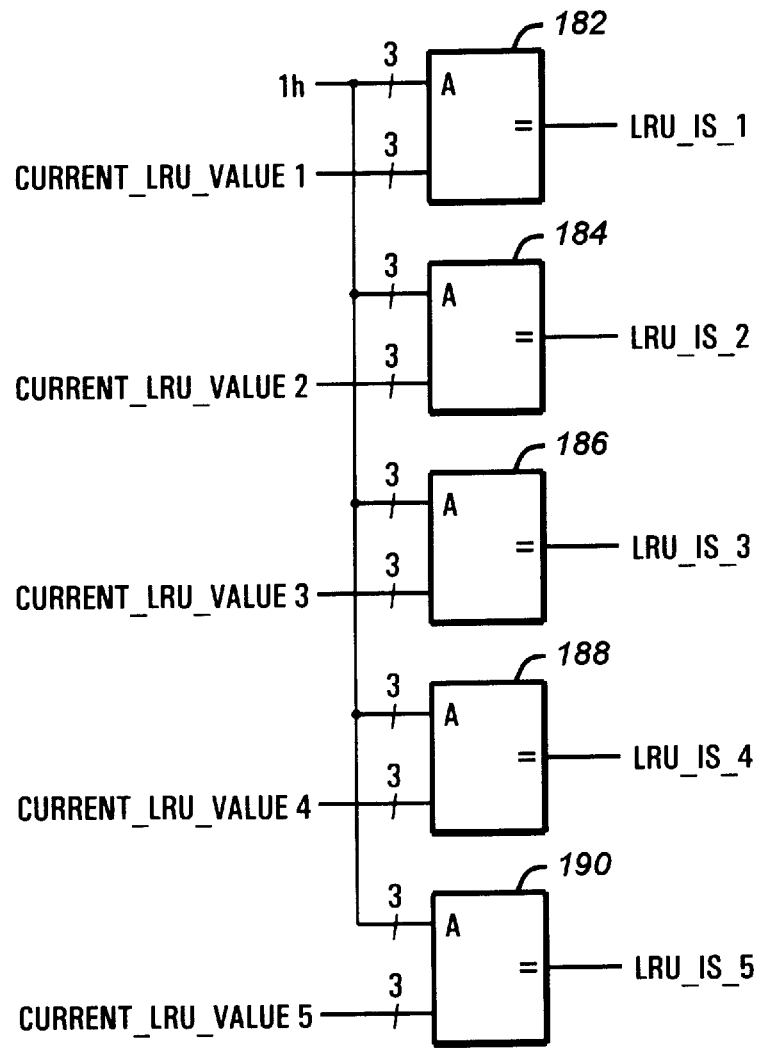
FIG. 10 is a block diagram of an LRU identifier of the adaptive read-ahead buffer.

SEL_6 =  !UPDATE_CURRENT_HOOKUP_NUMBER · !HIT · LRU_IS_1 +
         UPDATE_CURRENT_HOOKUP_NUMBER · HIT · !HIT_1 · !HIT_2 · !HIT_4 · !HIT_5
``` where UPDATE_CURRENT_HOOKUP_NUMBER is a signal requesting the active LRU be updated, as detailed in FIG. 5, HIT_n is a signal indicating that the location requested is stored in FIFO_n, HIT is a signal indicating that one of the HIT_n signals has been asserted and LRU_IS_n is a signal indicating that the least recently used FIFO is FIFO_n, as explained shortly below with respect to FIG. 10. In this manner, in the event of a miss, the next active LRU value is updated with the current LRU value. In the event of a hit, the next active LRU value points to the FIFO with the requested data.

Figure 8:
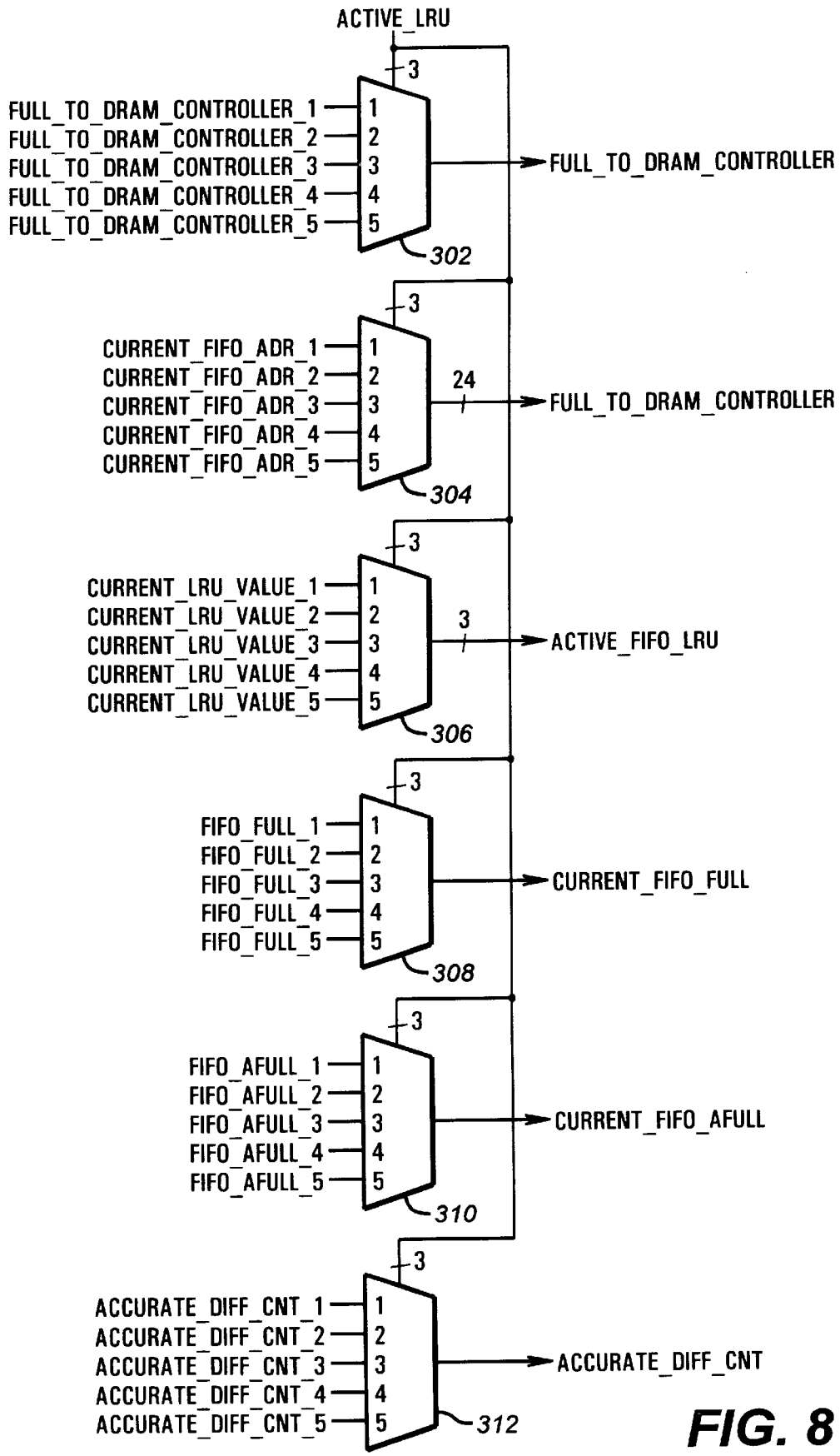
FIG. 8 is a schematic diagram of multiplexers used in the adaptive read-ahead buffer.

FIG. 8 discloses in more detail the use of the ACTIVE_LRU bus to select various inputs for the currently active FIFO. In FIG. 8, a plurality of signals FULL_TO_DRAM_CONTROLLER_n indicating that FIFO_n is full is provided to a multiplexer 302 which, as selected by the ACTIVE_LRU bus, generates FULL_TO_DRAO_CONTROLLER to signal the DRAM controller 146 that the currently active FIFO is full. Similarly, the ACTIVE_LRU bus is used to select the current FIFO address from FIFOs 150–160 via a multiplexer 304, which generates PCI_BS_RD_FIFO_BS_ADR to indicate the address of the locations cached by the currently selected FIFO.

The active LRU signal is also used to select ACTIVE_FIFO_LRU bus via a multiplexer 306. ACTIVE_FIFO_LRU indicates the current LRU value of the currently active FIFO. Similarly, ACTIVE_LRU is used to select CURRENT_FIFO_FULL and CURRENT_FIFO_AFULL via multiplexers 308 and 310, respectively. ACTIVE_LRU is further used in an analogous manner to select ACCURATE_DIFF_CNT which tracks the difference between the number of reads and writes to and from the active FIFO via a multiplexer 312. Thus, ACTIVE_LRU is used to select signals from the FIFOs 150–160 to decode the signals to that of the active FIFO unit.

Figure 9:
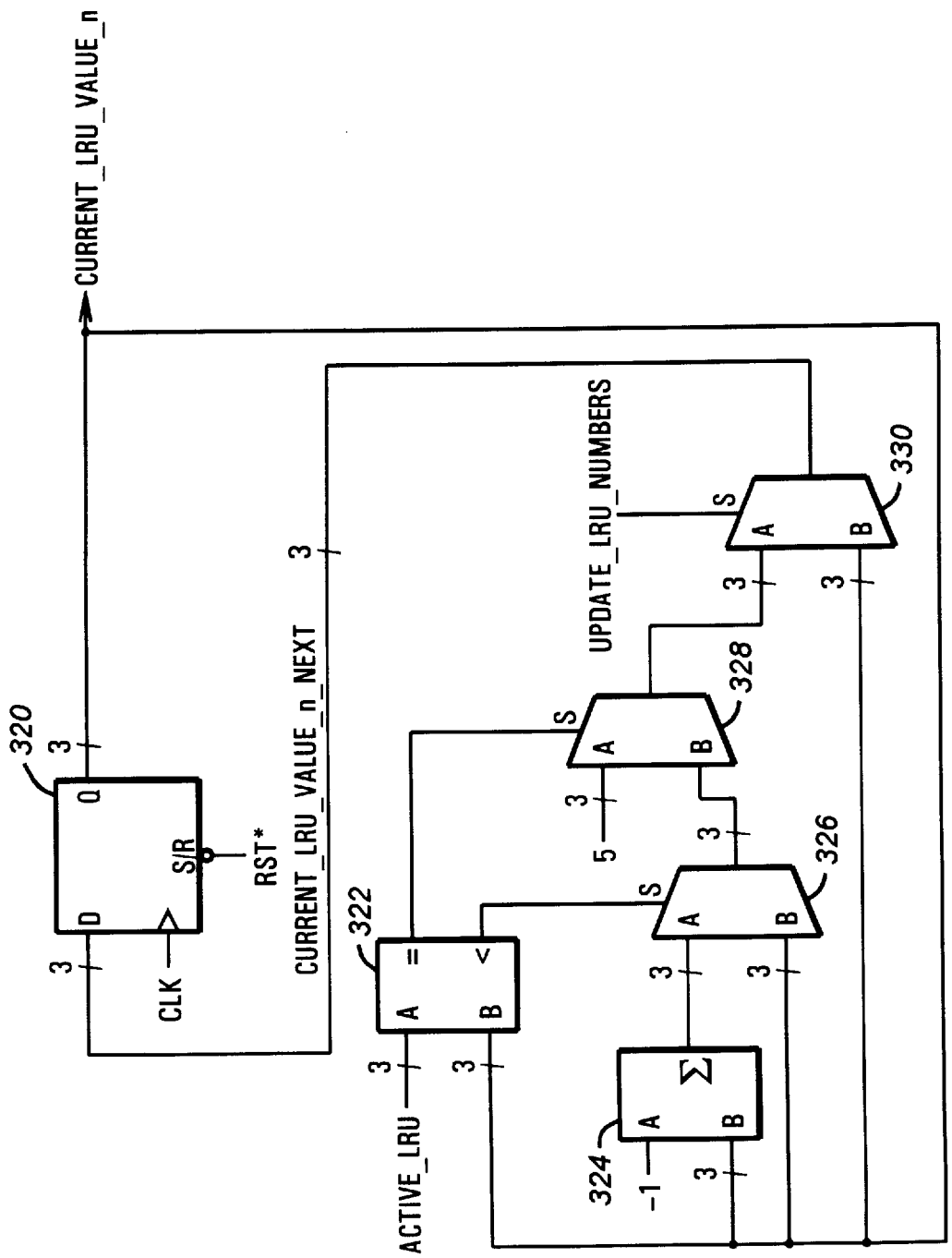
FIG. 9 is a block diagram of a current LRU state tracker of the adaptive read-ahead buffer.

Turning to FIG. 9, a representative circuit for one of the LRU algorithm modules 172–180 is disclosed in more detail. As shown in FIG. 9, CURRENT_LRU_VALUE_n is stored by a plurality of flip-flops 320. Upon the assertion of the reset signal RST*, the flip-flops 320, clocked by CLK, are preconfigured to an appropriate value n using the set and reset inputs of the flip-flops. For instance, upon reset, LRU_ALGOL_1 module 172, contains a value of one, LRU_ALGOL_2 module 174 contains a value of two, etc.

CURRENT_LRU_VALUE_n is provided to a comparator 322 whose other input is connected to the ACTIVE_LRU bus. The equal output of the comparator the 322 is connected to a selection input S of a multiplexer 328, while the less than output of the comparator 322 is connected to a selection input S of a multiplexer 326. If the equal output of the comparator 322 is asserted, the multiplexer 328 passes data from input A to its output; otherwise the data from input B is presented at the output of the multiplexer 328. Similarly, if the less than output of the comparator 322 is asserted, the data from input A of the multiplexer 326 is presented to the B input of the multiplexer 328. Otherwise, CURRENT_LRU_VALUE_which appears at the B input of the multiplexer 326 is presented to the B input of multiplexer 328. A decrementer 324, shown as an adder configured to add a value of negative one, is connected to CURRENT_LRU_VALUE_n to decrement CURRENT_LRU_VALUE_n. The output of the decrementer 324 is provided to the A input of the multiplexer 326. The B input of the multiplexer 326 is connected to the CURRENT_LRU_VALUE_n. The output of the multiplexer 326 is connected to the AB input of the multiplexer 328. The output of the multiplexer 328 is connected to the A input of a multiplexer 330. The B input of the multiplexer 330 is connected to CURRENT_LRU_VALUE_n. The multiplexer 330 is selected by UPDATE_LRU_NUMBERS. The output of the multiplexer 330 is provided to the input of the plurality of flip-flops 320 to update the current LRU value.

The operation of the current LRU value update circuit is described next. In the event that the active LRU is equal to the current LRU value, the circuit updates the next current LRU value to preferably five, indicating that the FIFO is the most recently used FIFO. In the event that ACTIVE_LRU is less than the CURRENT_LRU_VALUE_n, the CURRENT_LRU_VALUE_n is decremented by the decrementer 324, thus moving CURRENT_LRU_VALUE_n toward a value of one. Upon reaching a value of one, the FIFO pointed to by the current LRU value is the least recently used and thus becomes the next candidate to be refilled. In all other cases, the current LRU value is preserved and is simply looped back to the inputs of the flip-flops 320.

FIG. 10 shows the circuits for identifying the FIFO candidate to be refilled next. In FIG. 10, each of a plurality of comparators 180–190 is connected to a value of one at one input and the CURRENT_LRU_VALUE_n from FIFO_n respectively at the other input. The thus connected comparators 180–190 can identify the refilling candidate by detecting the FIFO whose LRU_VALUE equals one.

Figure 11:
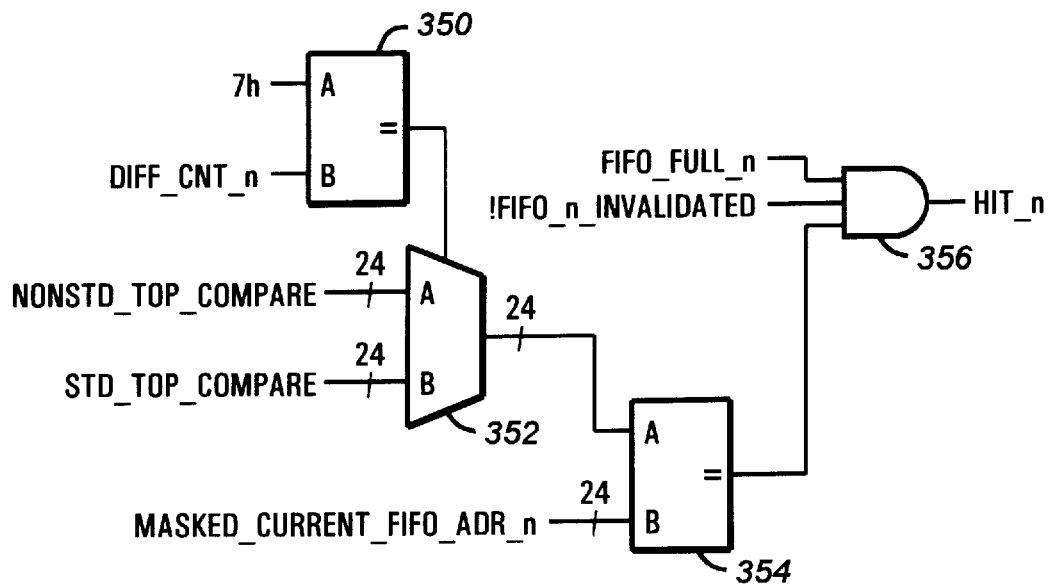
FIG. 11 is a block diagram of a hit detector of the adaptive read-ahead buffer.

Turning to FIG. 11, the circuit for generating the hit signals HIT_n from the hit/flush module 192 is disclosed. In FIG. 11, DIFF_CNT_n is provided to one input of a comparator 350. The other input of the comparator 350 is preset to a predetermined value, preferably seven. The output of the comparator 350 is used to select the inputs of a multiplexer 352 via the S input of the multiplexer 352. In the event DIFF_CNT_n equals seven, the comparator 350 provides NONSTANDARD_TOP_COMPARE to a comparator 354. Otherwise, STANDARD_TOP_COMPARE is provided to the comparator 354.

In the preferred embodiment, STANDARD_TO_COMPARE value is generated by adding eight to PCI_BS_REQUESTING_ADDRESS and masking the most significant two bits of PCI_BS_REQUESTING_ADDRESS based on SIXTY_FOUR, a signal which indicates the data width of the DRAM array 116 is 64. The value for NONSTANDARD_TOP_COMPARE is derived in a similar manner, except the PCI_BS_REQUESTING_ADDRESS is added with seven instead, so as to properly compute the bit address range in the boundary addressing condition where 64 bits of data are transferred and converted into 32-bit words. The output of the multiplexer 352 is provided to the A input of the comparator 354, while the B input of the comparator 354 is connected to MASKED_CURRENT_FIFO_ADR_n. MASKED_CURRENT_FIFO_ADR_n is generated by masking the upper two bits of CURRENT_FIFO_ADDRESS based on SIXTY_FOUR. If the addresses are equal, the output of the comparator 354, together with FIFO_FULL_n and !FIFO_n_INVALIDATED are evaluated by an AND gate 356. The output of the AND gate 356 is the HIT_n signal of the hit/flush block 192. In this manner, the address of the requested locations are compared with the address of the block of data buffered by the FIFOs 150–160 and checked for possible FIFO invalidation and FIFO full indications before HIT_n is asserted.

Figure 12:
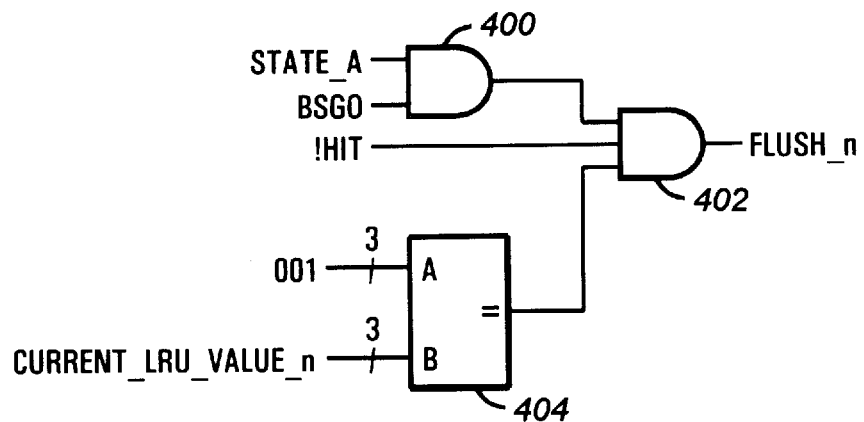
FIG. 12 is a block diagram of a flush detector for the adaptive read-ahead buffer.

Turning to FIG. 12, the circuit for generating the flush signal FLUSH_n of the hit/flush module 192 is disclosed in more detail. In FIG. 12, CURRENT_LRU_VALUE_n is compared against a value of 1 by a comparator 404. The output of the comparator 404 is provided to one input of an AND gate 402. One input of the AND gate 402 is connected to !HIT, while the other input of the AND gate 402 is connected to an AND gate 400 which ANDs STATE_A 200 with BSGO. The output of the AND gate 402 is the FLUSH_n signal of the hit/flush module 192. During operation, when the LRU value of the currently selected FIFO reaches one, indicating that the FIFO is the least recently used, HIT is false, the state machine is in the idle STATE_A and the bus slave is accessed, FLUSH_n is asserted to cause the FIFO_n to be flushed and to ultimately load in a new data block.

Figure 13:
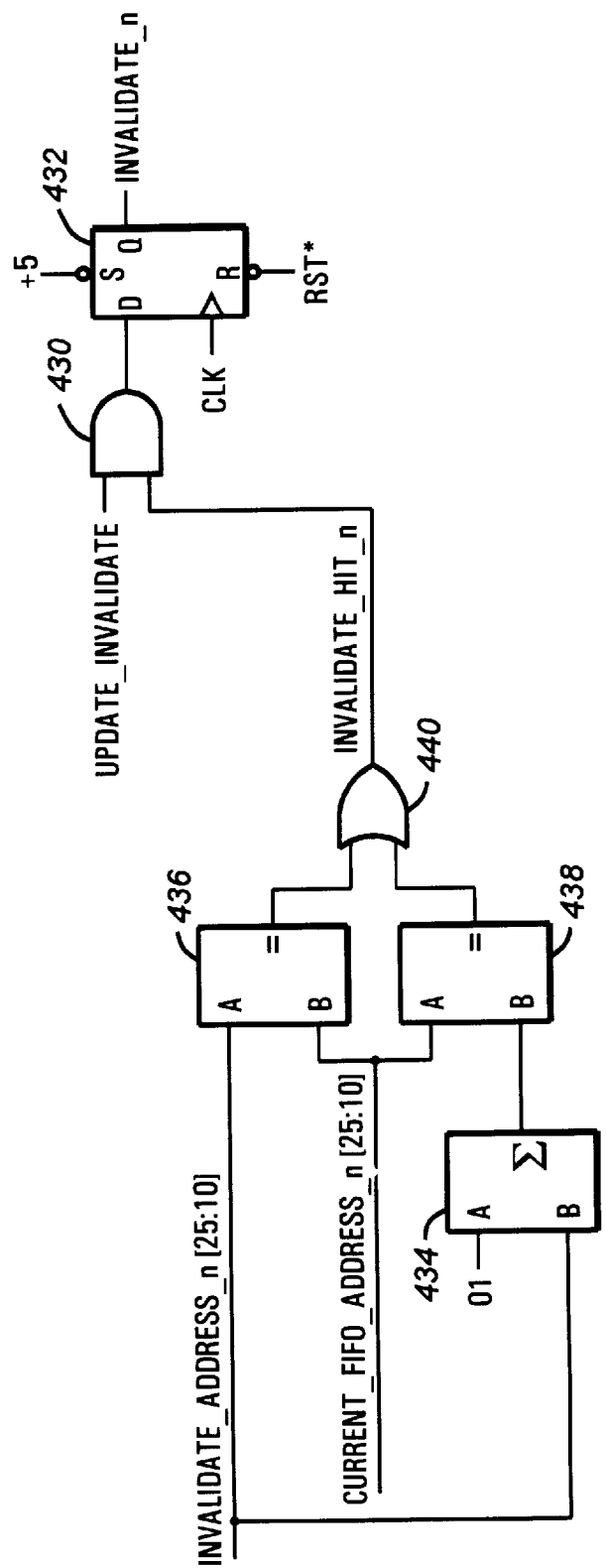
FIG. 13 is a block diagram of an invalidation detector for the adaptive read-ahead buffer.

Turning to FIG. 13, the circuitry of the invalidate hit module 198 is disclosed in greater detail. In FIG. 13, INVALIDATE_ADDRESS, as provided by the DRAM controller 146 when the bus slave is inactive and when write operations are directed to addresses buffered by the FIFOs, is compared with CURRENT_FIFO_ADDRESS_n of the FIFO via a comparator 436. To account for the addressing condition caused by 64-bit transfers in the preferred embodiment, a comparator 438 compares CURRENT_FIFO_ADDRESS_n with an incremented value of INVALIDATE_ADDRESS, which is provided by an adder 434. The comparison with the incremented INVALIDATE_ADDRESS detects the boundary condition wherein the tail end of the data stored in the FIFO is in a different address segment than the head end of the FIFO. The output of the comparators 436 and 438 is provided to an OR gate 440 as INVALIDATE_HIT_n. INVALIDATE_HIT_n is decoded with UPDATE_INVALIDATE via an AND gate 430. The output of AND gate 430 is provided to a flip-flop 432 which stores the updated INVALIDATE_n. The flip-flop 432 is clocked by CLK. In this manner, if the address of the data block currently stored by one of the FIFOs 150–160 matches INVALIDATE_ADDRESS, INVALIDATE_n is asserted to cause FIFO_n to be invalidated.

Figure 14:
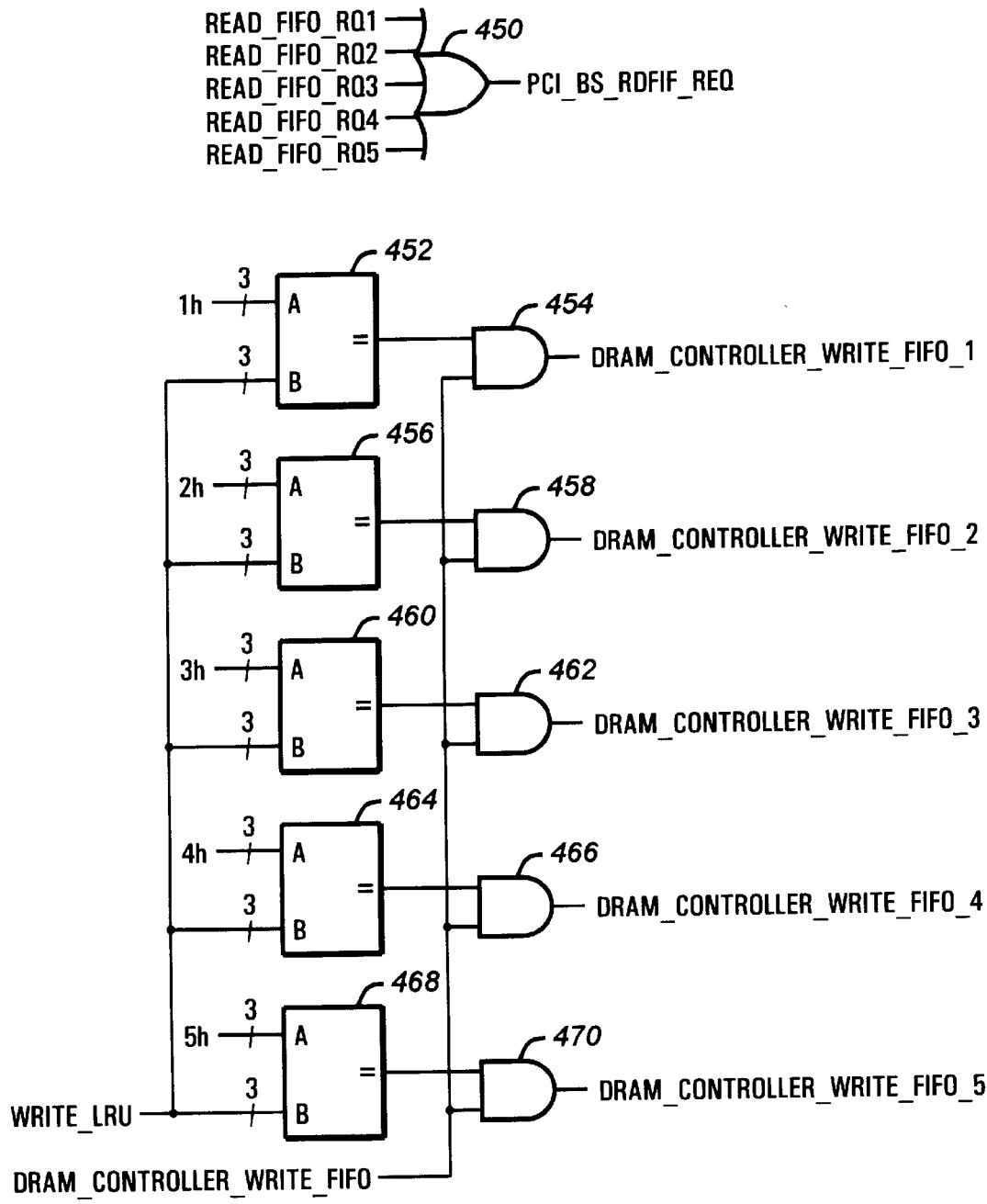
FIG. 14 is a block diagram of the read and write interface of the adaptive read-ahead buffer.

Turning to FIG. 14, the circuit to generate PCI_BS_RDFIF_REQ and DRAM_CONTROLLER_WRITE_FIFO_n are disclosed. PCI_BS_RDFIF_REQ is derived as a logical OR of the individual READ_FIFO_RQ_n signals from each of the FIFO blocks 150–160. The resulting common output PCI_BS_RDFIF_REQ is provided as one signal to the DRAM controller 146 to signal it that one of the FIFOs 150–160 is requesting data.

Turning to the DRAM_CONTROLLER_WRITE_FIFO_n block, the ACTIVE_LRU bus is provided to a plurality of comparators 452, 456, 460, 464, and 468. The other input to each of these comparators is preset to predetermined values, preferably 1, 2, 3, 4, and 5, respectively, to detect whether or not the FIFO selected by ACTIVE_LRU is FIFO 1, FIFO 2, FIFO 3, FIFO 4, or FIFO 5. This output is gated with the DRAM_CONTROLLER_WRITE_FIFO via a plurality of AND gates 454, 458, 462, 466, and 470 to generate DRAM_CONTROLLER_WRITE_FIFO1, DRAM_CONTROLLER_WRITE_FIFO2, DRAM_CONTROLLER_WRITE_FIFO3, DRAM_CONTROLLER_WRITE_FIFO4, and DRAM_CONTROLLER_WRITE_FIFO5, respectively. In this manner, a single DRAM_CONTROLLER_WRITE_FIFO signal from the DRAM controller 146 is decoded and eventually used to strobe data to each of the FIFOs 152–160. Further, the read output of the FIFO request are collectively presented as one input going into the DRAM controller 146, resulting in fewer interconnections between the DRAM controller 146 and the FIFOs 150–160.

Figure 15:
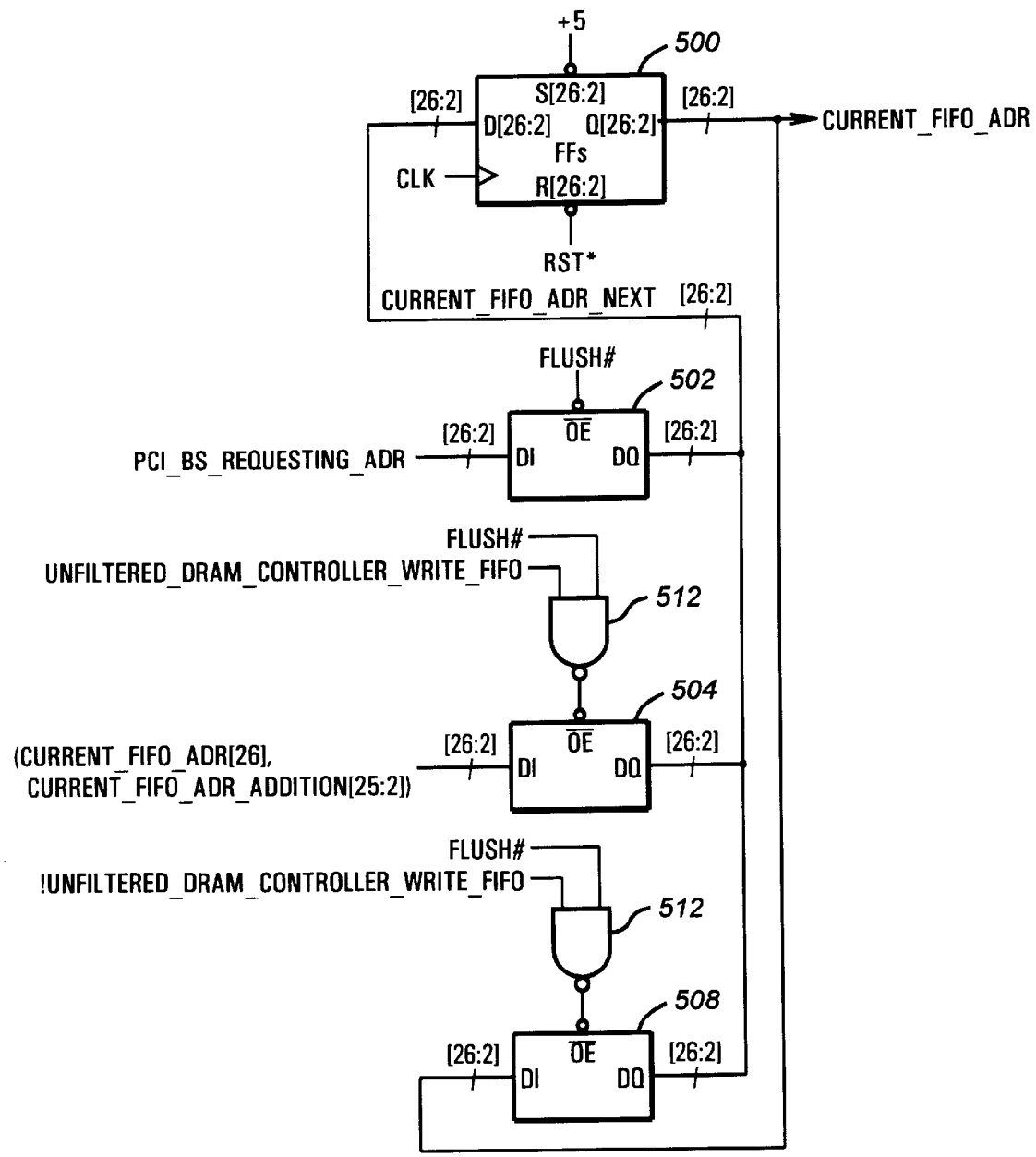
FIG. 15 is a block diagram of a FIFO current address tracker for the adaptive read-ahead buffer.

Turning to FIGS. 15–23, representative circuits of one of the plurality of FIFOs 150–160 are disclosed in more detail. FIG. 15 shows the circuit for generating the current FIFO address bus CURRENT_FIFO_ADR. The FIFO address bus is stored in a plurality of flip-flops 500. Upon the assertion of the reset signal RST*, CURRENT_FIFO_ADR is cleared to zero. On the following clock CLK, the plurality of flip-flops 500 samples data provided by CURRENT_FIFO_ADR_NEXT bus. CURRENT_FIFO_ADR_NEXT is driven by a plurality of buffers 502, 504, and 508. The input to the buffer 502 is PCI_BS_REQUESTING_ADR bus. This bus is gated onto CURRENT_FIFO_ADR_NEXT bus when FLUSH* is asserted. Thus, upon flushing, a data block from memory is loaded to the memory of the FIFO and the FIFO address range is set to correspond to PCI_BS_REQUESTING_ADR.

The input to the buffer 504 is a vector comprising bit 26 of CURRENT_FIFO_ADR and bits 2–25 of CURRENT_FIFO_ADR_ADDITION bus. Bit 26 is simply merged with CURRENT_FIFO_ADR_ADDITION because the most significant bit remains unaffected by any of the operations on the FIFO address. CURRENT_FIFO_ADDITION is a 24-bit vector generated by taking CURRENT_FIFO_ADR and adding two to it if the SIXTY_FOUR input is asserted and the combination of UNFILTERED_DRAM_CONTROLLER_WRITE_FIFO and EAT_FIRST_WRITE are deasserted. Otherwise, CURRENT_FIFO_ADR is incremented only once to generate CURRENT_FIFO_ADR_ADDITION. Thus, the FIFO address inputs to the flip-flops 504 are incremented once or twice, depending on the size of the transfer. UNFILTERED_DRAM_CONTROLLER_WRITE_FIFO is an undecoded write signal which is broadcasted to all FIFOs, while EAT_FIRST_WRITE signifies that, in a 64-bit data transfer, the upper byte is eliminated as it is not needed in a 32-bit request. The input to the buffers 504 are gated onto CURRENT_FIFO_ADR_NEXT by a NAND gate 506. FLUSH* is connected to one input of the NAND gate 506, while UNFILTERED_DRAM_CONTROLLER_WRITE_FIFO is connected to the other input of the NAND gate 506. Upon the assertion of the NAND gate 506, the incremented FIFO address is latched by a flip-flop 500.

Finally, the buffers 508 receive CURRENT_FIFO_ADR bus at the inputs. A NAND gate 512 connected to the buffers 508 detects when FLUSH* is deasserted and UNFILTERED_DRAM_CONTROLLER_WRITE_FIFO is deasserted to loop CURRENT_FIFO_ADR back onto CURRENT_FIFO_ADR_NEXT bus. In this manner, CURRENT_FIFO_ADR is appropriately updated with the new address or the current address.

Figure 16:
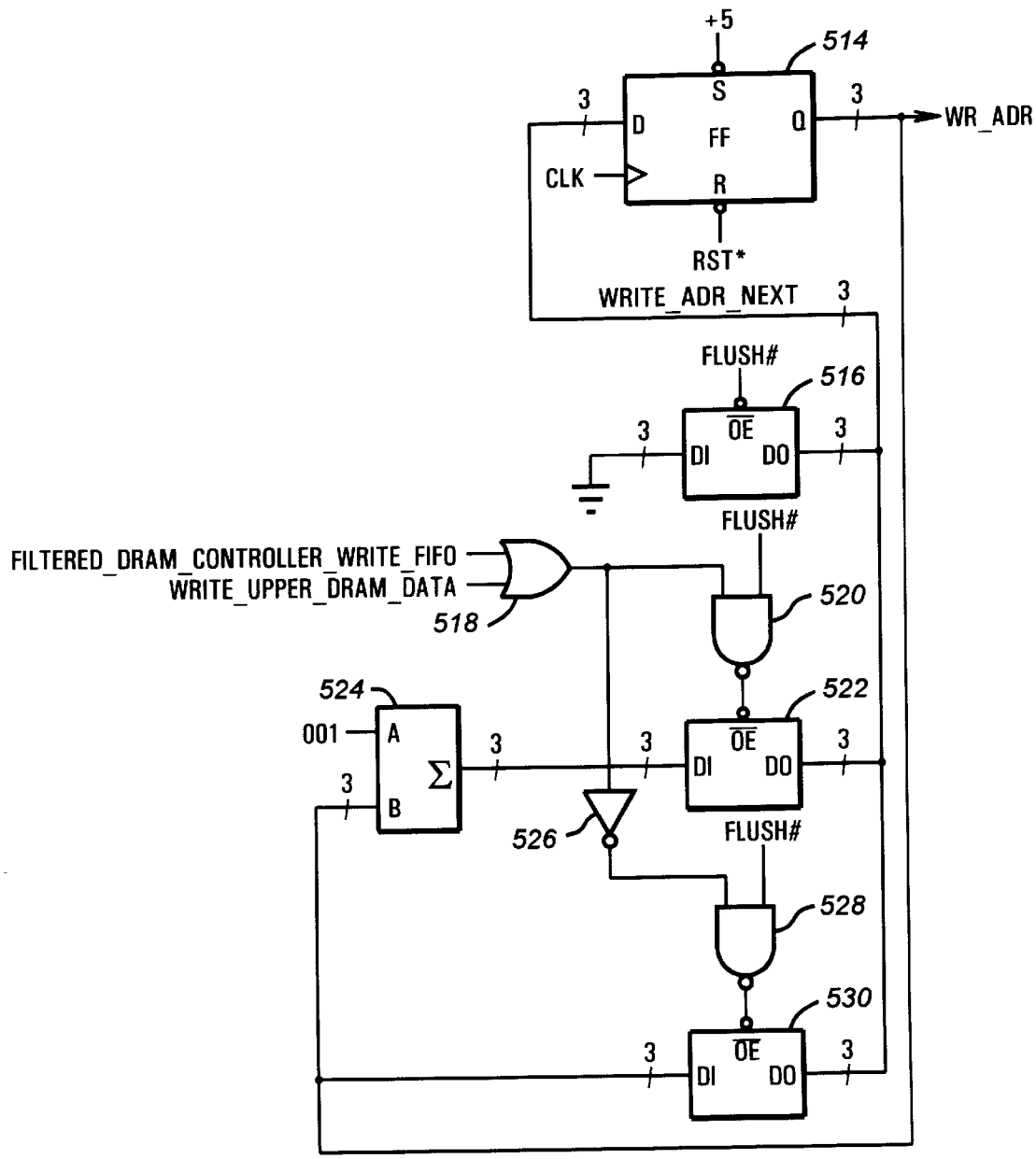
FIG. 16 is a block diagram of a FIFO write address generator for the adaptive read-ahead buffer.

The data being buffered by the FIFO is stored in a memory unit 623. Preferably, the memory 623 is a multiported 16-position, 32-bit wide memory for the FIFO storage. The memory 623 has a write address WR_ADR and a read address RD_ADR for pointing into the appropriate location of the memory. As shown in FIG. 16, WR_ADR is stored in a plurality of flip-flops 514. These flip-flops are cleared upon the assertion of RST* signal and clocked by CLK. The inputs to the plurality of flip-flops 514 are connected to WR_ADR_NEXT bus, which is driven by a plurality of buffers 516, 522, and 530. The inputs to the buffer 516 are grounded. Upon the assertion of FLUSH*, WR_ADR_NEXT is cleared to zero. The input to the buffer 522 is the incremented WR_ADR signal, as provided by an adder 524. The incremented WR_ADR is provided to WR_ADR_NEXT when the NAND gate 520 is asserted. When FLUSH* is false and FILTERED_DRAM_CONTROLLER_WRITE_FIFO or WRITE_UPPER_DRAM_DATA is asserted via an OR gate 518. The buffer 530 receives the WR_ADR at its inputs. In the event that the output of the OR gate 518 is deasserted, as indicated by inverter 526, and that FLUSH* is deasserted, a NAND gate 528 connected to the buffer 530 enables WR_ADR to be looped back to WR_ADR_NEXT.

During operation, when FLUSH* is asserted, the WR_ADR_NEXT bus is set to zero, causing WR_ADR to be cleared during the next clock. A write to one of the FIFOs 150–160 would cause WR_ADR_NEXT to be incremented, which is reflected in WR_ADR during the next clock CLK transition. Otherwise, the WR_ADR address lines are simply maintained by the flip-flops 514.

Figure 17:
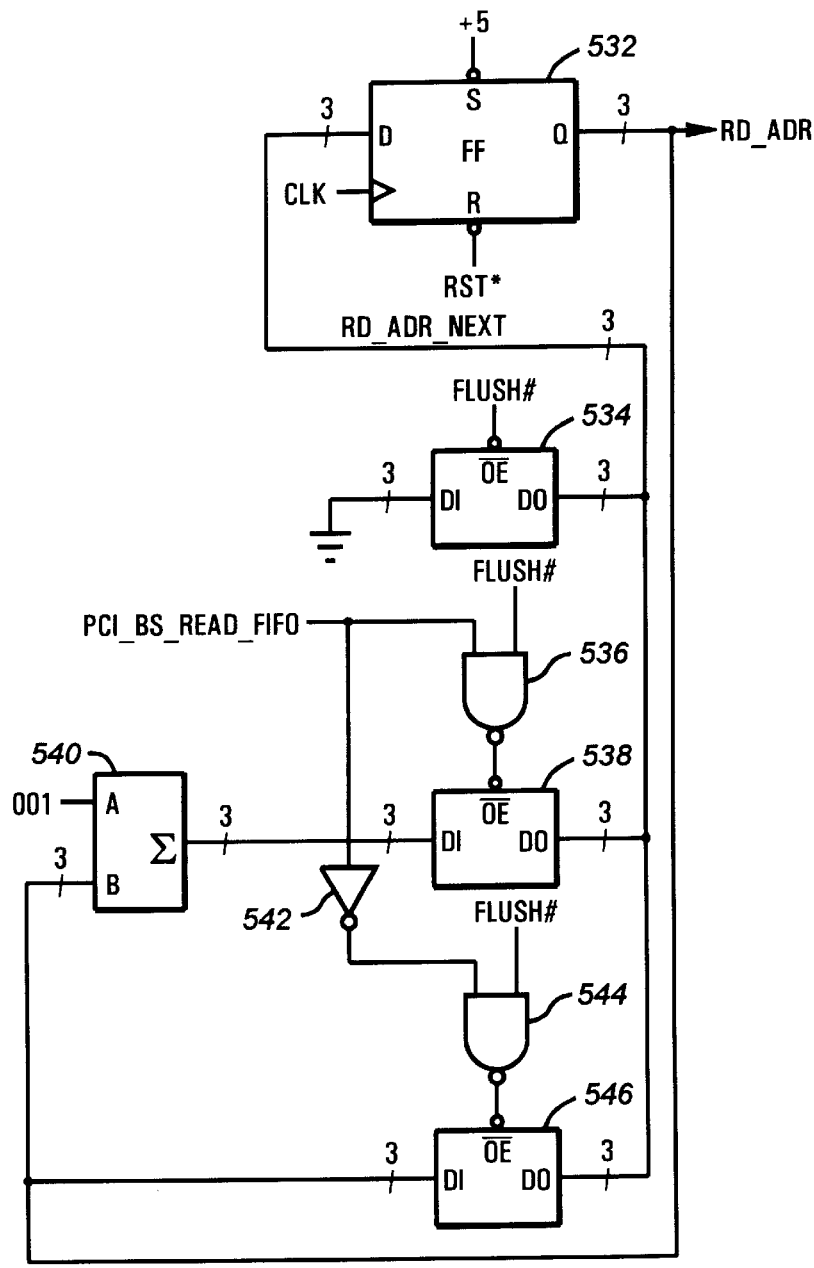
FIG. 17 is a block diagram of a FIFO read address generator for the adaptive read-ahead buffer.

The generation of the read address lines RD_ADR, as shown in FIG. 17, is similar to that of FIG. 16. RD_ADR signals are stored in a plurality of flip-flops 532. Upon the assertion of the reset signal RST*, RD_ADR is cleared to zero. RD_ADR is updated by the clock CLK signal. A plurality of buffers 534, 538, and 546 is connected to the inputs to the flip-flops 532, RD_ADR_NEXT. The inputs to the buffer 534 is grounded. Thus, upon the assertion of FLUSH*, RD_ADR_NEXT is cleared and during the subsequently clock transition, RD_ADR is also cleared.

RD_ADR is also connected to an incrementer 540, which is an adder preconfigured to add one to RD_ADR. The output of the incrementer 540 is provided to the input of the buffer 538. When PCI_BS_READ_FIFO, a read request to the slave FIFO is asserted and FLUSH* is deasserted, a NAND gate 536 enables the incremented RD_ADR to RD_ADR_NEXT. On the subsequent rising clock CLK edge, RD_ADR is also incremented. RD_ADR is connected to the inputs of a buffer 546. In the event that PCI_BS_READ_FIFO is deasserted as detected by an inverter 542 and FLUSH* is deasserted, a NAND gate 544 connected to buffer 546 simply loops RD_ADR to RD_ADR_NEXT. Thus, during a flush operation, RD_ADR is cleared; during a read operation, RD_ADR is incremented; and otherwise, RD_ADR remains the same.

Figure 18:
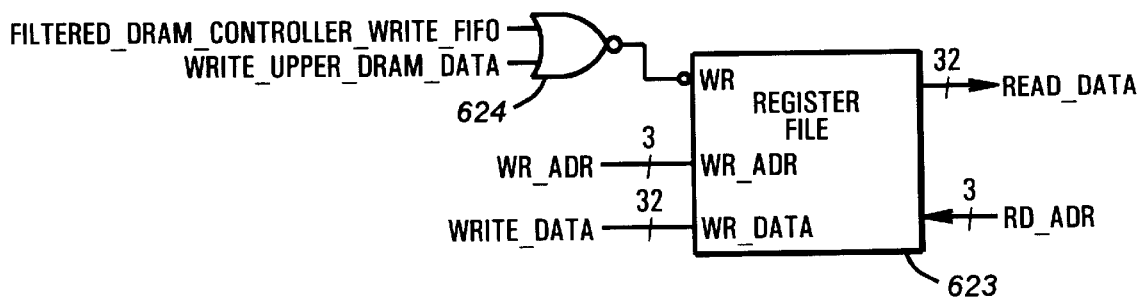
FIG. 18 is a block diagram of a FIFO data storage device of the adaptive read-ahead buffer.

FIG. 18 shows the read and write ports of the dual ported memory 623 for the FIFO. On the write side, the memory 623 has a write strobe WR, an address input WR_ADR, and a 32-bit data input, WR_DATA. To write to this memory, WR_DATA and the WR_ADR are presented to the memory, coupled with a write strobe WR in order to latch the data in the memory 623. Alternatively, in order to read the memory 623, a read address RD_ADR needs to be presented at the read address input and the read data can be retrieved via the read data port RD_DATA of the memory 623. Because the memory 623 is dual-ported, read and write operations can be performed simultaneously. Viewing FIGS. 16–18 in combination, every write strobe WR assertion to the memory 623 increments the write address WR_ADR. Similarly, every read causes the read address RD_ADR to the memory 623 to be incremented.

Figure 19:
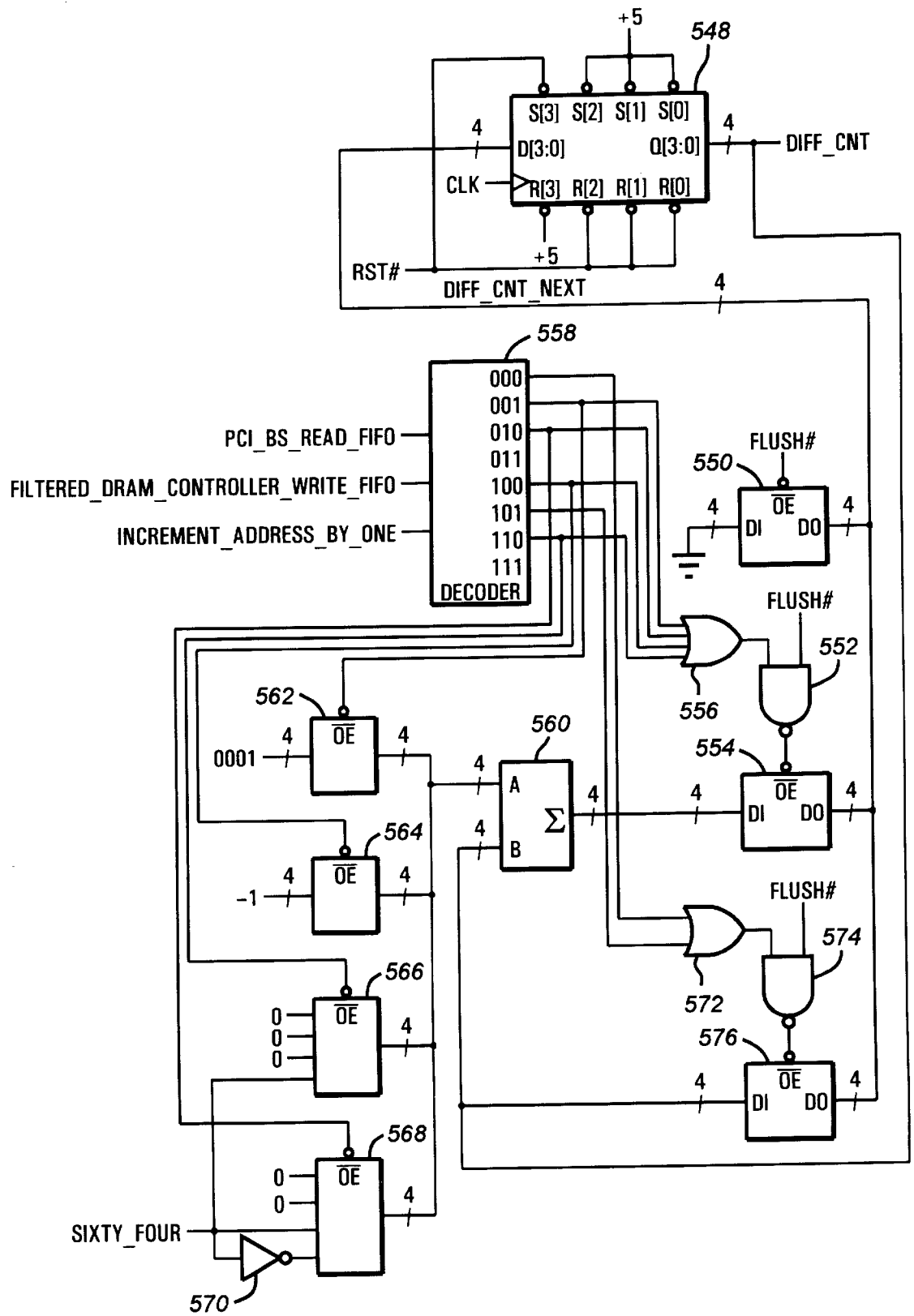
FIG. 19 is a block diagram of a FIFO differential counter for the adaptive read-ahead buffer.

In addition to generating the read and write address to the memory 623, the remaining space available in the FIFO memory 623 needs to also be tracked. FIG. 19 shows the circuits for tracking the difference between FIFO reads and writes to arrive at DIFF_CNT. DIFF_CNT is stored in a plurality of flip-flops 548 which is clocked by CLK. Upon the assertion of RESET*, DIFF_CNT is preset to the value of 8, representing eight 64-bit data or 16 32-bit words to indicate that the FIFO is full on RESET*. This value is incremented or decremented depending on whether or not a read or write has been performed. The flip-flops 548 are updated by DIFF_CNT_NEXT which is connected to the inputs of the flip-flops 548. Connected to DIFF_CNT_NEXT is a plurality of buffers 550, 554, and 576. The data inputs to the buffer 550 are grounded. Thus, when the FIFO is flushed via the assertion of FLUSH*, the buffer 550 clears DIFF_CNT_NEXT and on the next clock transition, DIFF_CNT is also zero to indicate that the maximum FIFO space is available. A decoder 558 is provided for interpreting PCI_BS_READ_FIFO, FILTERED_DRAM_CONTROLLER_WRITE_FIFO, and INCREMENT_ADDRESS_BY_ONE to detect whether or not DIFF_CNT should be incremented, decremented, or added with two. A plurality of buffers 562, 564, 566, and 568 are connected to and selected by the decoder 558. The input of buffer 562 is connected to a value of one to be provided to an adder 560 to increment DIFF_CNT. The input of the buffer 564 is set to a value of negative one or 15 to be provided to the adder 560 to decrement DIFF_CNT. The input to the buffer 566 is connected to SIXTY_FOUR in the least significant bit to increment DIFF_CNT based on the DRAM memory transfer width of either 64 bits or 32 bits. Finally, the input to the buffer 568 is connected to SIXTY_FOUR at bit 1 and the !SIXTY_FOUR in bit 0 via an inverter 570 to add by two in the SIXTY-FOUR mode and otherwise to add by one. The outputs of the buffers 562–568 are connected together and provided to one input of the adder 560. The other input of the adder 560 is connected to DIFF_CNT. The output of the adder 560 is connected to the input of a buffer 554. An OR gate 556 is connected to the decoded outputs 1, 2, 4, and 6 of the decoder 558 for detecting when DIFF_CNT needs to be incremented by 1, −1, or 2. When any one of these decoder outputs are active and when FLUSH* is deasserted, the output of a NAND gate 552 is asserted to gate the output of the adder 560 to DIFF_CNT_NEXT via the buffer 554. A buffer 576 handles the condition where DIFF_CNT is to remain the same. The input of the buffer 576 is also connected to DIFF_CNT. An OR gate 572 detects the assertion of the zero or the fifth output of the decoder 558 for detecting that DIFF_CNT is to remain the same. When either of those outputs are asserted and FLUSH* is deasserted, a NAND gate 574 enables the DIFF_CNT to be connected to DIFF_CNT_NEXT to maintain the DIFF_CNT value. In this manner, DIFF_CNT tracks the read requests in accordance with the width of the transfer of 64 or 32 bits.

Figure 20:
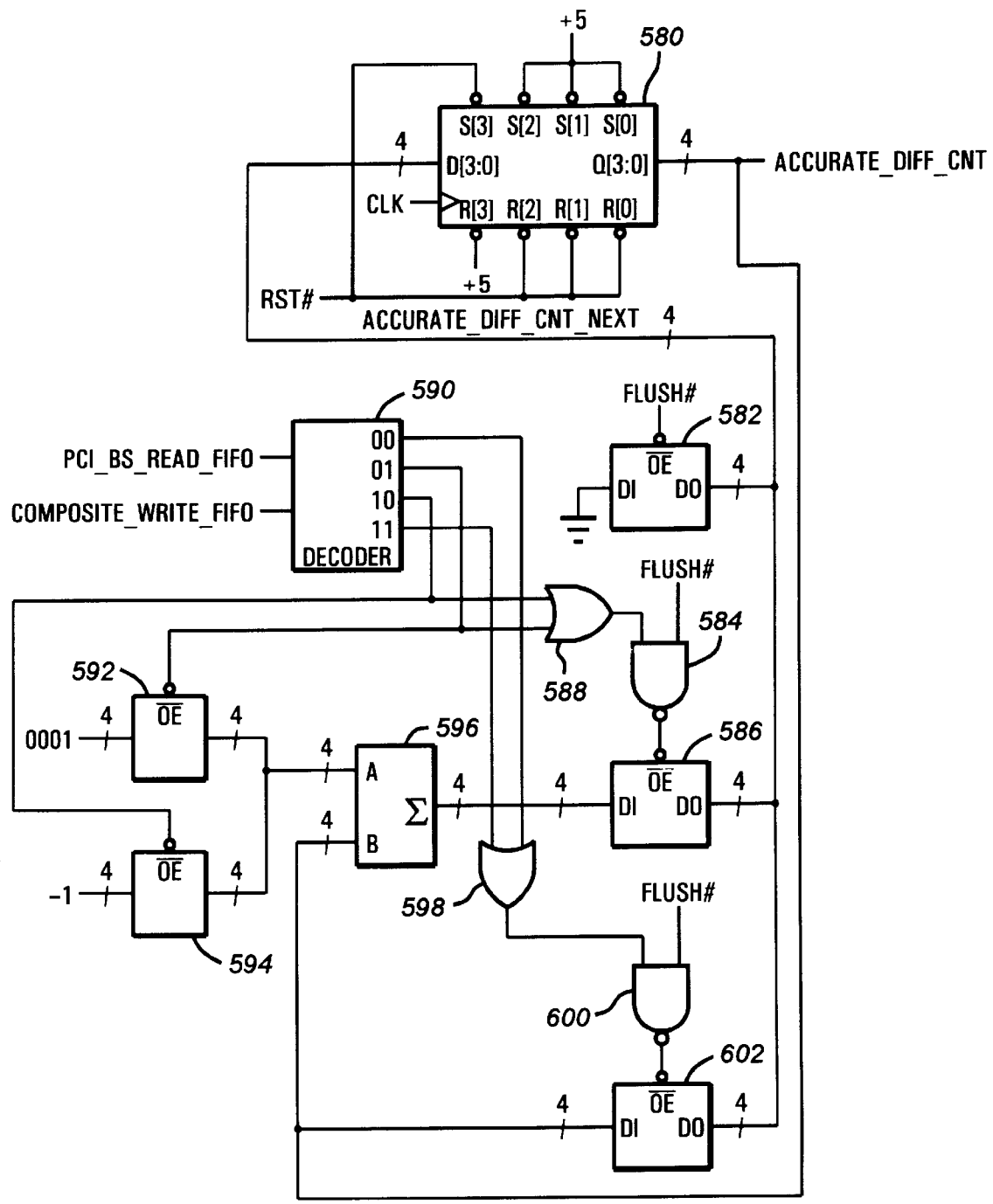
FIG. 20 is a block diagram of a FIFO accurate differential counter for the adaptive read-ahead buffer.

Turning to FIG. 20, the circuit for maintaining the ACCURATE_DIFF_CNT is disclosed. ACCURATE_DIFF_CNT tracks the absolute number of reads and writes presented to the FIFO, in contrast to DIFF_CNT, which varies in accordance with the SIXTY_FOUR or 32-bit data transfer mode. ACCURATE_DIFF_CNT is stored in a plurality of flip-flops 580. The flip-flops 580 are preconfigured so that upon power-up, ACCURATE_DIFF_CNT is set at 8, representing eight 64-bit data or sixteen 32-bit words, to indicate that the FIFO is full. The input to the flip-flops 580 are connected to ACCURATE_DIFF_CNT_NEXT bus. Connected to this bus are a plurality of buffers 582, 586, and 602. The input to buffer 582 is grounded. Thus, when FLUSH* is asserted, the buffer 582 zeroes out the ACCURATE_DIFF_CNT_NEXT bus and on the subsequent clock transition, ACCURATE_DIFF_CNT is cleared. The buffers 586 and 602 determine whether or not ACCURATE_DIFF_CNT is next incremented, decremented, or maintained. The increment, decrement, or maintain function is controlled by a decoder 590. The inputs to the decoder 590 are PCI_BS_READ_FIFO and COMPOSITE_WRITE_FIFO, a signal indicating that the FIFOs are written to. When the 1 and 2 output of the decoder 590 are high, indicating that either PCI_BS READ_FIFO or COMPOSITE_WRITE_FIFO is being asserted, an OR gate 588 is asserted. When the FLUSH* is deasserted and the output of the OR gate 588 is asserted, a NAND gate 584 is asserted to provide the output of an adder 596 to ACCURATE_DIFF_CNT via a buffer 586. One input of the adder 596 is connected to ACCURATE_DIFF_CNT while the other is connected to buffers 592 and 594. When the decoder output 1 is active, signifying a COMPOSITE_

WRITE_FIFO operation, the decoder output selects the buffer 592 which gates the value of one to a second input of the adder 596 to increment ACCURATE_DIFF_CNT. Alternatively, when the decoder output 2 is asserted, signifying a PCI bus slave read operation, a −1 value from the buffer 594 is provided to the second input of the adder 596 to decrement ACCURATE_DIFF_CNT.

In operation, when PCI_BS_READ_FIFO is asserted, ACCURATE_DIFF_CNT is decremented and gated across buffer 586 to ACCURATE_DIFF_CNT_NEXT so that on the next clock transition, ACCURATE_DIFF_CNT is decremented appropriately. Alternatively, when COMPOSITE_WRITE_FIFO is asserted, the buffer 592 causes the adder 596 to increment the ACCURATE_DIFF_CNT value and provides that to the buffer 586. When the output enable signal to the buffer 586 is asserted, this incremented value is provided to ACCURATE_DIFF_CNT_NEXT signal so that on the next clock transition, ACCURATE_DIFF_CNT is appropriately incremented.

Alternatively, when either PCI_BS_READ_FIFO is zero and COMPOSITE_WRITE_FIFO are both asserted or cleared, an OR gate 598 is asserted. The NAND gate 600 is connected to the output of the OR gate 598 and FLUSH* to enable the buffer 602. The NAND gate 600 is connected to the buffer 602, which has ACCURATE_DIFF_CNT at its inputs. Thus, when PCI_BS_READ_FIFO and COMPOSITE_WRITE_FIFO have the same value and FLUSH* is negated, the buffer 602 simply transfers ACCURATE_DIFF_CNT to ACCURATE_DIFF_CNT_NEXT bus so that the values are maintained.

Figure 21:
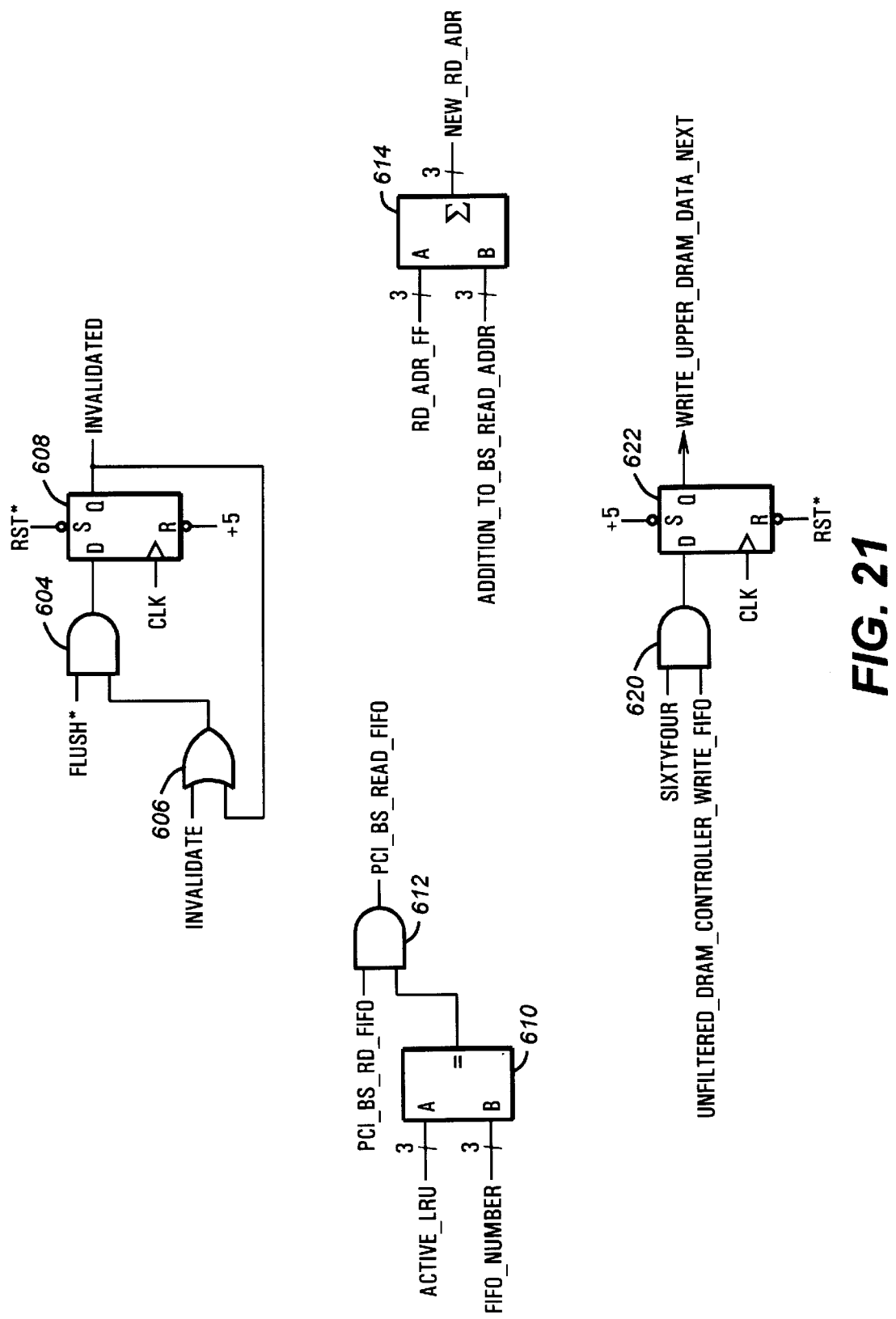
FIGS. 21, 22 and 23 are schematic diagrams of various support circuits of the FIFO of the adaptive read-ahead buffer.

Turning to FIG. 21, the circuits for generating INVALIDATED, PCI_BS_READ_FIFO, NEW_RD_ADR, and WRITE_UPPER_DRAM_DATA_NEXT are disclosed. INVALIDATED indicates whether or not the FIFO has been invalidated. INVALIDATED is stored in a flip-flop 608 and provided as an output. The INVALIDATE signal is provided to one input of an OR gate 606, while the other input is connected to the INVALIDATE output from the flip-flop 608. The output of the gate 606 is connected to one input of the AND gate 604 while the other input of gate 604 is connected to FLUSH* signal. The output of the AND gate 604 is connected to the D input of the flip-flop 608. The flip-flop 608 is configured so that upon the assertion of RST*, the flip-flop is set to indicate that the FIFO has been invalidated. During operation, if FLUSH* is asserted, INVALIDATED is cleared during the next clock. Further, during operation, if INVALIDATE is asserted and FLUSH is negated, the FIFO indicates that it has been invalidated in the next clock.

The circuit to decode the FIFO read signal, PCI_BS_READ_FIFO is discussed next. ACTIVE_LRU and FIFO_NUMBER are compared by a comparator 610. FIFO_NUMBER is a value preassigned to the FIFO to indicate that it is the nth FIFO, where n is preferably a value from 1 to 5. The output of the comparator 610 is provided to an AND gate 612. The other input of the AND gate 612 is connected to PCI_BS_RD_FIFO, the bus slave read signal, to generate the decoded PCI_BS_READ_FIFO. In this manner, the generic read signal PCI_BS_RD_FIFO is decoded to a specific FIFO, as selected by ACTIVE_LRU.

An adder 614 provides an updated NEW_RD_ADR which modifies RD_ADR of FIG. 17 before presenting the read address signal to memory 623 of the FIFO. In adder 614, READ_ADR is provided to one input, while ADDITION_TO_BS_READ_ADDR is provided to the other input. The resulting output, NEW_RD_ADR, corrects for read addresses in the event the PCI bus enters WAIT states. ADDITION_TO_BS_READ_ADDR is a value ranging from 0 to 2 which properly offsets READ_ADR to the correct data as expected by the PCI bus after the PCI bus encounters a wait state.

WRITE_UPPER_DRAM_DATA_NEXT is latched by a flip-flop 622 which is cleared upon the assertion of RST*. The signals SIXTY_FOUR and UNFILTERED_DRAM_CONTROLLER_WRITE_FIFO are provided to an AND gate 620, whose output is provided to the input of the flip-flop 622. In this manner, a 64-bit write operation causes the assertion of WRITE_UPPER_DRAM_DATA_NEXT to indicate that the upper word of the transfer needs to be written.

Figure 22:
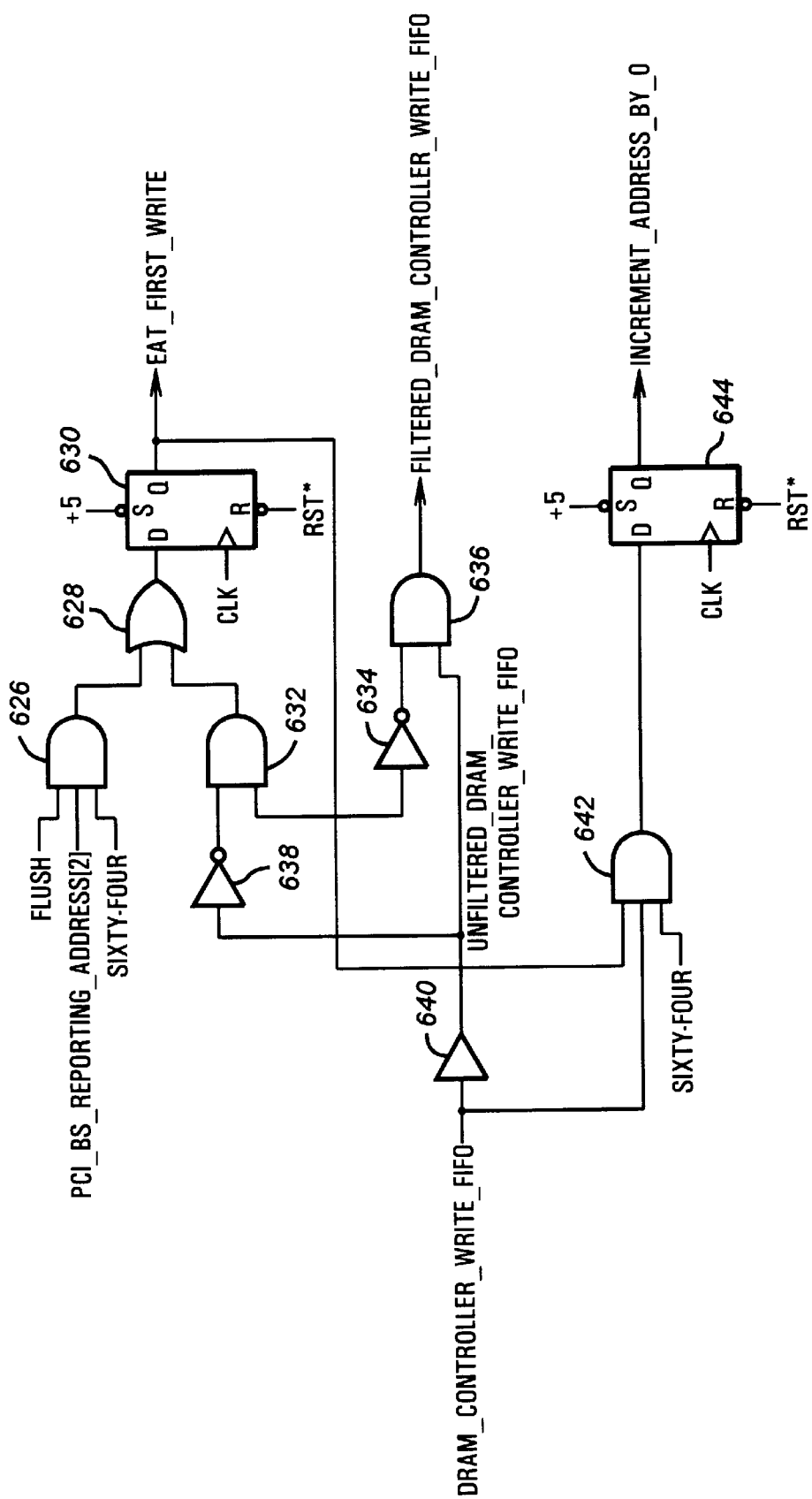

Turning to FIG. 22, the circuit for converting data according to the 64/32-bit format is disclosed. FLUSH, bit 2 of PCI_BS_REQUESTING_ADDRESS, and SIXTY_FOUR are provided to an AND gate 626 whose output is connected to one input of an OR gate 628. Bit 2 of PCI_BS_REQUESTING_ADDRESS is set when, in a 64-bit mode, the bus master wants the upper DWORD first. The other input of the OR gate 628 is connected to an AND gate 632, whose inputs are !UNFILTERED_DRAM_CONTROLLER_WRITE_FIFO, as negated by an inverter 638. The other input of the AND gate 632 is connected to EAT_FIRST_WRITE, which is the output of a flip-flop 630. The OR gate 628 is connected to the input of the flip-flop 630. Thus, EAT_FIRST_WRITE is an output indicating that the lower 32-bit word transfers is to be disposed of when the system is in a 64-bit transfer mode, FLUSH* is asserted and the data requested is an upper part of the double word. Thus, when the bus master accesses only the upper DWORD, EAT_FIRST_WRITE filters the write to the FIFO and throws the first word away. EAT_FIRST_WRITE is inverted by an inverter 634 whose output is provided to one input of an AND gate 636. The other input to the AND gate 636 is a buffered version of DRAM_CONTROLLER_WRITE_FIFO, also known as UNFILTERED_DRAM_CONTROLLER_WRITE_FIFO. The output of the AND gate 636 is a decoded signal FILTERED_DRAM_CONTROLLER_WRITE_FIFO. EAT_FIRST_WRITE is also provided to one input of an AND gate 642. The other inputs to the AND gate 642 include DRAM_CONTROLLER_WRITE_FIFO and SIXTY_FOUR. The output of the AND gate 642 is provided to a flip-flop 644 and is latched as the INCREMENT_ADDRESS_BY_ONE signal. Thus, INCREMENT_ADDRESS_BY_ONE increments the address to point to the upper word when the 64-bit data is retrieved from memory. Both the flip-flops 630 and 644 are cleared upon the assertion of RST* and clocked by CLK.

Figure 23:
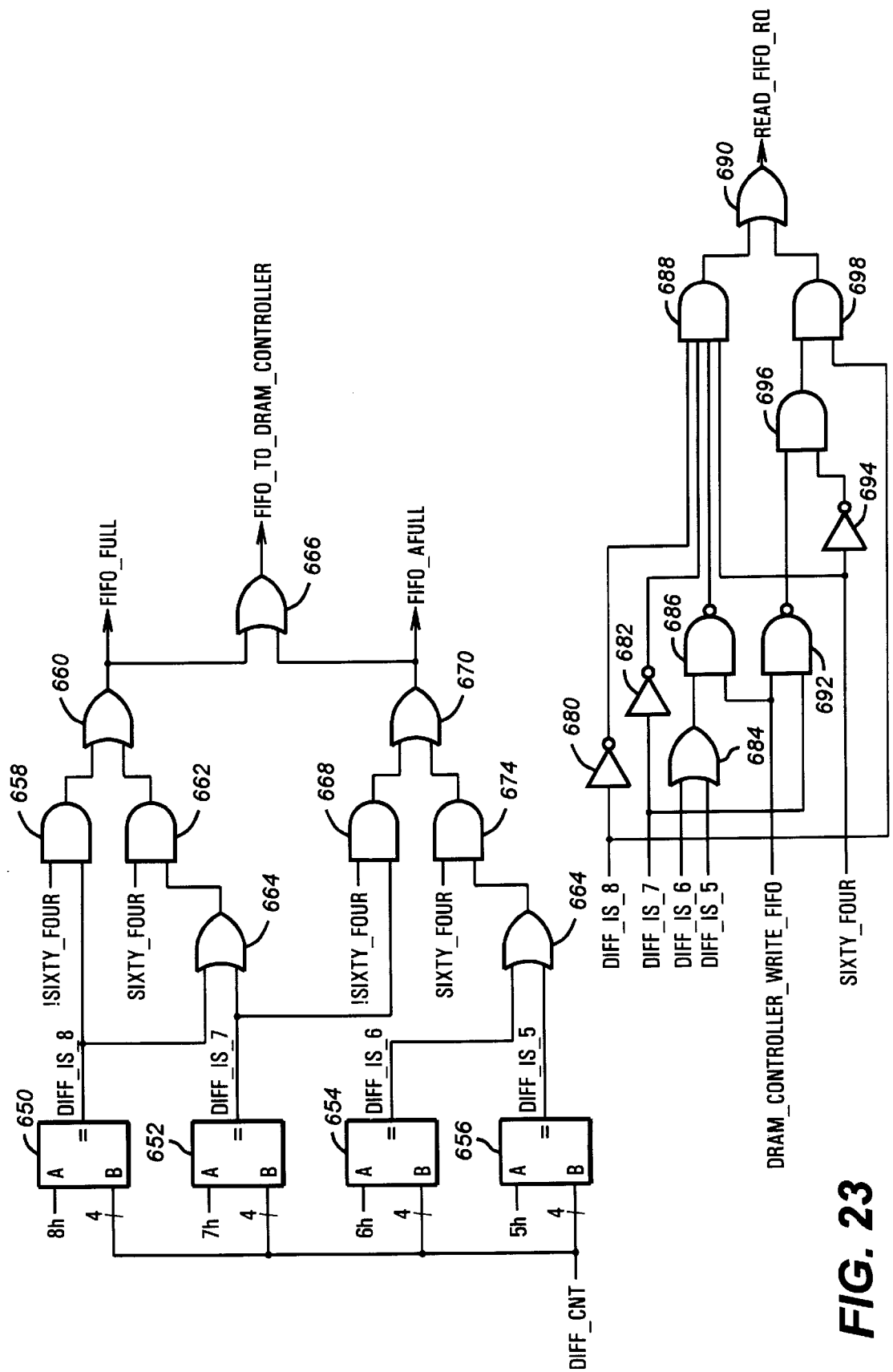

Turning to FIG. 23, the circuits for detecting the FIFO full and FIFO almost full conditions are presented. In FIG. 23, DIFF_CNT bus is provided to a plurality of comparators 650, 652, 654, and 656. Each of the comparators 650–656 is preconfigured to compare DIFF_CNT against the values 8, 7, 6, and 5 respectively. The output of the comparator 650 is DIFF_IS_8. Similarly, the output of the comparator 652 is DIFF_IS_7, the output of the comparator 654 is DIFF_IS_6, and the output of the comparator 656 is DIFF_IS_5. DIFF_IS_8 and !SIXTY_FOUR are provided to an AND gate 658. The other input of the OR gate 660 is connected to an AND gate 662. DIFF_IS_7 and DIFF_IS_8 is OR'd together via an OR gate 664, whose output is provided to the AND gate 662. The other input of AND gate 662 is connected to SIXTY_FOUR. The output of the AND gate 662 is further connected to the other input of the OR gate 660 to generate FIFO_FULL output, which is asserted when eight words have been written in a 32-bit mode or when seven words have been written in a 64-bit mode.

Similarly, DIFF_IS_6 is OR'd with DIFF_IS_5 by an OR gate 672, whose output is provided to an AND gate 674. The other input to the AND gate 674 is SIXTY_FOUR. The output of the AND gate 674 is provided to an OR gate 670. The other input to the OR gate 670 is connected to the output of an AND gate 668. The inputs to the AND gate 668 are DIFF_IS_7 and !SIXTY_FOUR. The output of the OR gate 670 is FIFO_AFULL, a signal indicating the FIFO is almost full. Further, the output of the OR gate 660 and 670 are OR'd together by an OR gate 666 to generate FULL_TO_DRAO_CONTROLLER a signal to the DRAM controller indicating that the FIFO is full. During operation, if the transfer is not a 64-bit transfer, the FIFO is considered to be full when the DIFF_CNT equals 8. However, if the transfer is a 64-bit transfer and DIFF_CNT equals 7, the FIFO_FULL flag is asserted in anticipation of the coming second 32-bit data transfer which fills up the FIFO. Similarly, FIFO_AFULL is set when DIFF_CNT is 6 and data is not being transferred in the 64-bit mode. Conversely, when the data transfer is occurring at the 64-bit mode, if DIFF_CNT is equal to 5, then the FIFO_AFULL flag is set to indicate that the FIFO is almost full.

Figure 24:
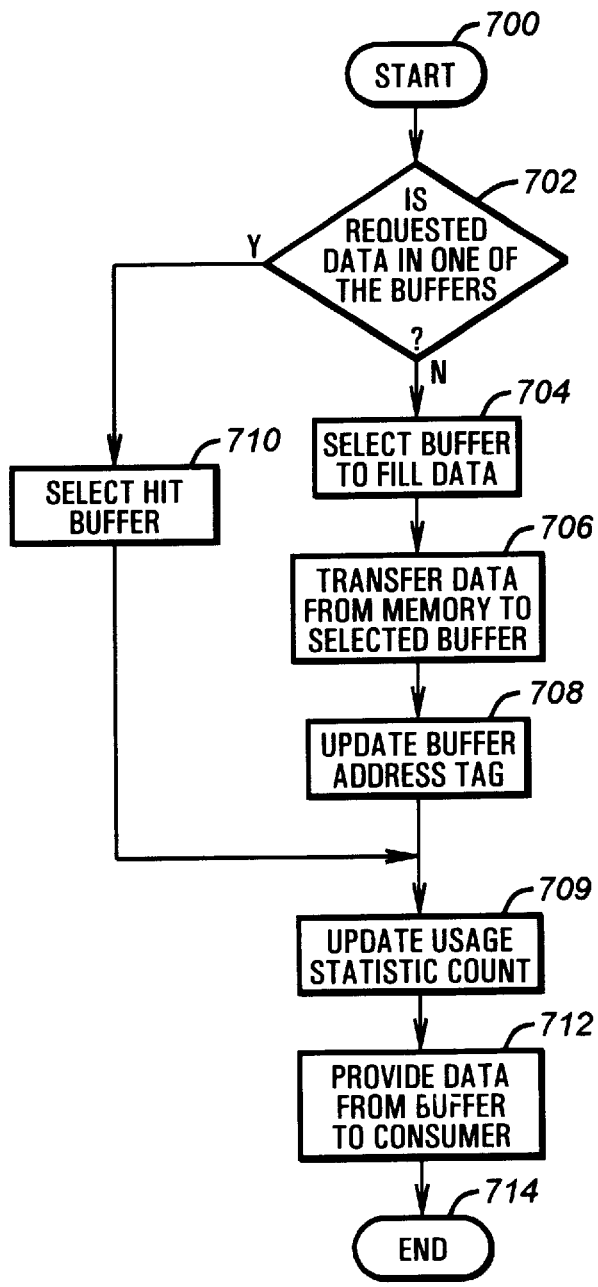
FIG. 24 is a flow diagram of the adaptive read-ahead buffering process.

Turning to the logic to generate READ_FIFO_RQ signal, DIFF_IS_8 is connected to an inverter 680 whose output is connected to one input of an AND gate 688. DIFF_IS_7 is also connected to an inverter 682 whose output is connected to the second input of the AND gate 688. DIFF_IS_6 and DIFF_IS_5 are connected to the input of an OR gate 684 whose output is provided to one input of a NAND gate 686. The other input of the NAND gate 686 is connected to DRAM_CONTROLLER_WRITE_FIFO. The output of the NAND gate 686 is connected to the third input of the AND gate 688. The fourth input of the AND gate 688 is connected to 64 input. The output of the AND gate 688 is connected to one input of the OR gate 690. The DRAM_CONTROLLER_WRITE_FIFO is connected to one input of a NAND gate 692. The other input of NAND gate 692 is connected to DIFF_IS_7. The output of the NAND gate 692 is presented to the input of an AND gate 696. The other input of the AND gate 696 is connected to an inverted version of 64 via inverter 694. The output of the AND gate 696 is connected to the input of an AND gate 698, whose other input is connected to DIFF_IS_8. The output of the AND gate 698 is connected to the input of the OR gate 690 to generate READ_FIFO_RQ. The thus configured circuit maintains the refill request from the read FIFO to the DRAM array 116 when a write operation is directed to the FIFO and the FIFO is not full or almost full. Turning now to FIG. 24, the flow chart for adaptively buffering data requests from a consumer 90 to a memory array 116 is disclosed. In step 702, the FIFO buffers 152–160 are checked to see if they contain the requested data. If so, a read hit condition has occurred. In the event of a read-miss, the system selects a candidate buffer from one of the FIFO buffers 152–160 to hold new data in step 704. The buffer selection process in step 704 preferably uses a least-recently-used algorithm. Next, in step 706, data is transferred from the memory array 116, to the candidate buffer. Further, the candidate buffer address tag is updated with the requested address in step 708. Next, a usage count, preferably an LRU count, is updated to reflect the fact that the candidate buffer now contains the most recently used data. In step 712, data is then provided to the consumer. In the event that a hit condition is detected in step 702, one of the FIFO buffers 150–160 is identified as the hit buffer in step 710. Next, the LRU count for the hit buffer is updated in step 709 to reflect that the hit buffer contains the most recently used data before continuing processing in step 713.

Figure 25:
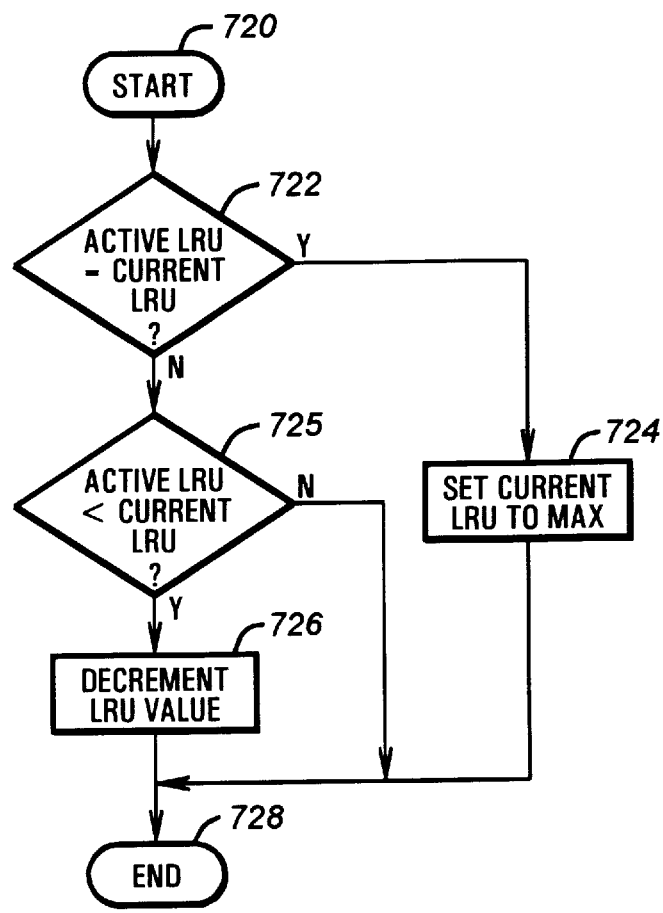
FIG. 25 is a flow diagram of the LRU buffer replacement process.

Turning now to FIG. 25, the process for updating the LRU count for each of the FIFO buffers 150–160 is disclosed. In step 722, the system compares the current LRU value maintained by each of the FIFO buffers 150–160 against the active LRU count, which reflects the currently active FIFO buffer. If the active LRU value equals the current LRU value in each of the FIFO buffers 152–160, the current LRU value is set to the maximum value, preferably five, to indicate that the FIFO holds recently used data. Alternatively, if the active LRU count is less than the FIFO buffer's current LRU value in step 715, the current LRU value is decremented in step 726. When the current LRU value of one of the FIFO buffers 150–160 reaches one, that particular FIFO buffer is considered to be the LRU FIFO buffer candidate for refilling purposes.

As explained above, the present invention improves the read-ahead performance of a computer system by providing a plurality of read-ahead FIFOs, each operates with a least recently used replacement policy. Upon reset, the FIFO's are all marked full, and invalidated, such that no hit occurs on an initial access to each FIFO. The FIFO selection is controlled by a least recently used algorithm, which selects the FIFO least recently used. If a hit occurs, the FIFO with the hit contains the requested data. This particular FIFO will be placed on the bottom of the least recently used stacked after the connection to the bus slave channel has been terminated by the requesting bus master. Further, accesses to the DRAM controller through the bus slave are locked to ensure coherency. While the bus slave is inactive, the LRU block snoops the writes to the DRAM controller to determine if any invalidation cycles to one of the plurality of FIFO's are necessary.

In the event that a data request by the currently active bus master or thread does not result in a hit to any of the FIFOS, the least recently used FIFO is selected as a candidate for replacement purposes. Data belonging to requests by other bus masters or threads that are more recent in usage activities are preserved to be reused in the near future. As data belonging to an inactive bus master or thread is not flushed prematurely to make room for handling requests from the current bus master or thread, each FIFO is effectively assigned to a different thread, thus improving the overall buffering performance in multi-tasking applications.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. A read-ahead buffer for buffering data requests from a consumer to a memory, said consumer having address outputs for issuing an address request and consumer data inputs to receive data responsive to said address request, said memory having memory read control inputs for reading from said memory, memory address inputs and memory data outputs, said read-ahead buffer comprising:

a plurality of FIFO buffers, each of said FIFO buffers having data inputs coupled to said memory data outputs for storing data from said memory, data outputs coupled to said consumer data inputs for providing data to said consumer, address inputs coupled to said consumer address outputs for storing an address range, address outputs for presenting said address range, and having buffer control inputs for reading and writing data to said FIFO buffers;

a hit detector having address inputs coupled to said FIFO buffer address outputs and to said consumer address outputs, said hit detector having control outputs coupled to said buffer control inputs and having a miss output, said hit detector comparing said address request from said consumer with said FIFO buffer address ranges, said hit detector asserting said buffer control inputs to provide data from said FIFO buffer whose address range matches said address request to said consumer and otherwise asserting said miss output;

a flush detector coupled to said hit detector and said buffers, said flush detector causing the buffer selected by said hit detector to be flushed if the data in said buffer has been invalidated; and a miss controller having a miss input coupled to said miss output, buffer control outputs coupled to said FIFO buffer control inputs, address inputs coupled to said consumer address output, memory read control outputs coupled to said memory read control inputs, and memory address outputs coupled to said memory address inputs, said miss controller responding to said miss output assertion by selecting a candidate buffer from one of said FIFO buffers, providing said address request to said memory address input, asserting said memory read control outputs and said buffer control outputs to transfer data associated with said address request from said memory into said candidate buffer and to update said candidate buffer address range, and providing the requested data to said consumer from said candidate buffer.

2. The read-ahead buffer of claim 1, wherein each of said FIFO buffers includes:

a data storage memory having a predetermined capacity, a write strobe input for receiving a write request, a write address input for receiving a write address value, a read strobe input for receiving a read request and a read address input for receiving a read address value;

a write address generator having a write address output coupled to said write address input of said data storage memory, said write address generator incrementing said write address value after each write strobe assertion to said data storage memory;

a read address generator having a read address output coupled to said read address input of said data storage memory, said read address generator incrementing said read address value after each read strobe assertion to said data storage memory;

a difference counter having a read input coupled to said read strobe input, a write input coupled to said write strobe input, and a difference output for storing a difference value, said difference counter incrementing said difference value upon each write request to said data storage memory and decrementing said difference value upon each read request from said data storage memory; and a full indicator having an input coupled to said difference output of said difference counter, said full indicator being asserted when said difference value equals said predetermined capacity and deasserted otherwise.

3. The read-ahead buffer of claim 2, wherein said read address generator further includes:

a register having an input for receiving a next read address value and an output for presenting said read address value; and an incrementer having an input coupled to said register output and an output coupled to said register input to increment said read address value upon a read of said FIFO buffer.

4. The read-ahead buffer of claim 2, wherein said write address generator further includes:

a register having an input for receiving a next write address value and an output for presenting said write address value; and an incrementer having an input coupled to said register output and an output coupled to said register input to increment said write address value upon a write of said FIFO buffer.

5. The read-ahead buffer of claim 2, wherein said full indicator is a comparator.

6. The read-ahead buffer of claim 1, wherein said hit detector is a comparator having inputs respectively coupled to said address request and said address range of one of said FIFO buffers.

7. The read-ahead buffer of claim 1, wherein said miss controller further comprises a plurality of adaptive buffer replacement counters, each of said counters respectively coupled to each of said FIFO buffers, said counters monitoring usage statistics of said FIFO buffers and generating an active LRU value to identify said candidate buffer from one of said FIFO buffers based on said usage statistics.

8. The read-ahead buffer of claim 7, wherein each of said plurality of adaptive buffer replacement counters corresponding to each of said FIFO buffers is a least recently used counter.

9. The read-ahead buffer of claim 8, wherein said least recently used counter includes:

a register having an output for holding a current LRU value; and a comparator having inputs coupled to said register output and said active LRU value, said comparator setting said register output to a predetermined maximum if said active LRU value equals said current LRU value and otherwise decrementing said register output.

10. The read-ahead buffer of claim 1, further comprising a bus snooper for monitoring bus write addresses of write operations to said memory and invalidating the FIFO buffer whose address range matches said bus write address.

11. The read-ahead buffer of claim 10, wherein said bus snooper includes a comparator having inputs respectively coupled to said address request and said address range of one of said FIFO buffers.

12. A read-ahead buffer comprising:

a bus master;

a main memory;

a plurality of buffers coupled to said bus master and said memory, each of said buffers having a data block and an address associated with said data block, said data block mirroring said memory at said data block address;

an invalidate address comparator coupled to said memory and said buffers, said invalidate address comparator receiving an invalidate address from said memory, said invalidate address comparator comparing the invalidate address with the address of each buffer and invalidating the buffer bearing the address matching the invalidate address;

a plurality of adaptive buffer replacement counters, each of said counters respectively coupled to each of said buffers, said counters monitoring usage statistics of said buffers and identifying one of said buffers as a refill candidate buffer based on said usage statistics;

a hit detector coupled to said buffers and said counters, said hit detector receiving the address of a data request from the bus master and comparing the address of each of said buffers with the address of the bus master data request, said hit detector asserting a hit output corresponding to one of said buffers if the request from the bus master is contained in said buffers;

a flush detector coupled to said hit detector, to said buffers and to said counters, said flush detector causing the buffer selected by said hit detector to be flushed if said buffer has been invalidated by said invalidate address comparator; and a buffer selector coupled to said buffers, to said hit detector, to said flush detector and to said counters, said buffer selector coupling the buffer selected by said hit detector to said bus master if said selected buffer has not been invalidated by said invalidate address comparator, said buffer selector otherwise transferring the requested data from said memory to said refill candidate buffer and coupling said refill candidate buffer to said bus master.

13. The read-ahead buffer of claim 12, wherein each of said buffers includes:

a data storage memory having a predetermined capacity, a write strobe input for receiving a write request, a write address input for receiving a write address value, a read strobe input for receiving a read request and a read address input for receiving a read address value;

a write address generator having a write address output coupled to said write address input of said data storage memory, said write address generator incrementing said write address value after each write strobe assertion to said data storage memory;

a read address generator having a read address output coupled to said read address input of said data storage memory, said read address generator incrementing said read address value after each read strobe assertion to said data storage memory;

a difference counter having a read input coupled to said read strobe input, a write input coupled to said write strobe input, and a difference output for storing a difference value, said difference counter incrementing said difference value upon each write request to said data storage memory and decrementing said difference value upon each read request from said data storage memory; and a full indicator having an input coupled to said difference output of said difference counter, said full indicator being asserted when said difference value equals said predetermined capacity and deasserted otherwise.

14. The read-ahead buffer of claim 12, wherein each of said plurality of adaptive buffer replacement counters corresponding to each of said FIFO buffers is a least recently used counter.

15. The read-ahead buffer of claim 14, wherein said least recently used counter includes:

a register having an output for holding a current LRU value; and a comparator having inputs coupled to said register output and said active LRU value, said comparator setting said register output to a predetermined maximum if said active LRU value equals said current LRU value and otherwise decrementing said register output.

16. The read-ahead buffer of claim 12, further comprising a bus snooper for monitoring bus write addresses of write operations to said memory and invalidating the FIFO buffer whose address range matches said bus write address.

17. A computer system, comprising:

a processor;

a display coupled to said processor;

a disk drive consumer having address outputs for issuing an address request and consumer data inputs to receive data responsive to said address request;

a memory having memory read control inputs for reading from said memory, memory address inputs and memory data outputs for providing data responsive to said memory address inputs; and a read-ahead buffer for buffering data requests from said consumer to said memory, said read-ahead buffer including:

a plurality of FIFO buffers, each of said FIFO buffers having data inputs coupled to said memory data outputs for storing data from said memory, data outputs coupled to said consumer data inputs for providing data to said consumer, address inputs coupled to said consumer address outputs for storing an address range, address outputs for presenting said address range, and having buffer control inputs for reading and writing data to said FIFO buffers;

a hit detector having address inputs coupled to said FIFO buffer address outputs and to said consumer address outputs, said hit detector having control outputs coupled to said buffer control inputs and having a miss output, said hit detector comparing said address request from said consumer with said FIFO buffer address ranges, said hit detector asserting said buffer control inputs to provide data from said FIFO buffer whose address range matches said address request to said consumer and otherwise asserting said miss output; and a miss controller having a miss input coupled to said miss output, buffer control outputs coupled to said FIFO buffer control inputs, address inputs coupled to said consumer address output, memory read control outputs coupled to said memory read control inputs, and memory address outputs coupled to said memory address inputs, said miss controller responding to said miss output assertion by selecting a candidate buffer from one of said FIFO buffers, providing said address request to said memory address input, asserting said memory read control outputs and said buffer control outputs to transfer data associated with said address request from said memory into said candidate buffer and to update said candidate buffer address range, and providing the requested data to said consumer from said candidate buffer.

18. The computer system of claim 17, wherein each of said FIFO buffers includes:

a data storage memory having a predetermined capacity, a write strobe input for receiving a write request, a write address input for receiving a write address value, a read strobe input for receiving a read request and a read address input for receiving a read address value;

a write address generator having a write address output coupled to said write address input of said data storage memory, said write address generator incrementing said write address value after each write strobe assertion to said data storage memory;

a read address generator having a read address output coupled to said read address input of said data storage memory, said read address generator incrementing said read address value after each read strobe assertion to said data storage memory;

a difference counter having a read input coupled to said read strobe input, a write input coupled to said write strobe input, and a difference output for storing a difference value, said difference counter incrementing said difference value upon each write request to said data storage memory and decrementing said difference value upon each read request from said data storage memory; and a full indicator having an input coupled to said difference output of said difference counter, said full indicator being asserted when said difference value equals said predetermined capacity and deasserted otherwise.

19. The computer system of claim 18, wherein said read address generator further includes:

a register having an input for receiving a next read address value and an output for presenting said read address value; and an incrementer having an input coupled to said register output and an output coupled to said register input to increment said read address value upon a read of said FIFO buffer.

20. The computer system of claim 18, wherein said write address generator further includes:

a register having an input for receiving a next write address value and an output for presenting said write address value; and an incrementer having an input coupled to said register output and an output coupled to said register input to increment said write address value upon a write of said FIFO buffer.

21. The computer system of claim 18, wherein said full indicator is a comparator.

22. The computer system of claim 17, wherein said hit detector is a comparator having inputs respectively coupled to said address request and said address range of one of said FIFO buffers.

23. The computer system of claim 17, wherein said miss controller further comprises a plurality of adaptive buffer replacement counters, each of said counters respectively coupled to each of said FIFO buffers, said counters monitoring usage statistics of said FIFO buffers and generating an active LRU value to identify said candidate buffer from one of said FIFO buffers based on said usage statistics.

24. The computer system of claim 23, wherein each of said plurality of adaptive buffer replacement counters corresponding to each of said FIFO buffers is a least recently used counter.

25. The computer system of claim 24, wherein said least recently used counter includes:

a register having an output for holding a current LRU value; and a comparator having inputs coupled to said register output and said active LRU value, said comparator setting said register output to a predetermined maximum if said active LRU value equals said current LRU value and otherwise decrementing said register output.

26. The computer system of claim 17, further comprising a bus snooper for monitoring bus write addresses of write operations to said memory and invalidating the FIFO buffer whose address range matches said bus write address.

27. The computer system of claim 26, wherein said bus snooper includes a comparator having inputs respectively coupled to said address request and said address range of one of said FIFO buffers.

28. A method for buffering data requests from a consumer to a memory, said consumer issuing an address request to retrieve data stored in said memory, said data buffered in a plurality of FIFO buffers coupled to said consumer and said memory, each of said FIFO buffers storing data and an address range associated with said data, said method comprising the steps of:

comparing said address request from said consumer with said FIFO buffer address ranges and providing data from said FIFO buffer whose address range matches said address request to said consumer;

flushing the buffer with the matching address if the data in said buffer has been invalidated; and when none of said address ranges matches said address request or when the buffer with the matching address has been flushed, requesting data from said memory, further including the steps of:

selecting a candidate buffer from one of said FIFO buffers;

transferring data associated with said address request from said memory into said candidate buffer;

updating said candidate buffer address range; and providing the requested data to said consumer.

29. The method of claim 28, wherein said comparing step further includes the steps of maintaining an active LRU value to identify an active buffer from one of said FIFO buffers.

30. The method of claim 28, wherein said selecting step includes the step of choosing the least recently used FIFO buffer.

31. The method of claim 30, further comprising the steps comparing said active LRU value to said current LRU value and setting said current LRU value to a predetermined maximum if said active LRU value equals said current LRU value and decrementing said current LRU value if said active LRU value is less than said current LRU value.

32. The method of claim 31, further comprising the step of selecting the FIFO buffer whose current LRU value equals one as the candidate buffer.

33. The method of claim 28, wherein said memory receives a write address, further comprising the steps of snooping said write address to said memory and invalidating the FIFO buffer whose address range matches said write address.

* * * * *

UNITED STATES PATENT AND TRADEMARK OFFICE
CERTIFICATE OF CORRECTION

PATENT NO. : 5,809,280
DATED : September 15, 1998
INVENTOR(S) : Gary F. Chard et al.

It is certified that error appears in the above-identified patent and that said Letters Patent is hereby corrected as shown below:

Title page, Item [54] and Column 1, line 1,
Title, after "ADAPTIVE" delete "AHEAD" and insert -- READ-AHEAD --.

Column 7,
Lines 45, 59, 63 and 64, delete "150-160" and insert -- 152-160 --.

Column 8,
Lines 3, 4, 5, 8, 20 and 23, delete "150-160" and insert -- 152-160 --.

Column 9,
Lines 2, 59 and 64, delete "150-160" and insert -- 152-160 --.

Column 10,
Lines 30 and 38, delete "150-160" and insert -- 152-160 --.

Column 11,
Line 25, delete "150-160" and insert -- 152-160 --.

Column 12,
Line 52, delete "150-160" and insert -- 152-160 --.

Column 13,
Lines 26, 33, 36, 57 and 59, delete "150-160" and insert -- 152-160 --.

Column 15,
Line 2, delete "150-160" and insert -- 152-160 --.

Column 19,
Line 50, the sentence starting "Turning now to" should start a new paragraph.
Line 67, delete "150-160" and insert -- 152-160 --.

UNITED STATES PATENT AND TRADEMARK OFFICE
CERTIFICATE OF CORRECTION

PATENT NO. : 5,809,280
DATED : September 15, 1998
INVENTOR(S) : Gary F. Chard et al.

It is certified that error appears in the above-identified patent and that said Letters Patent is hereby corrected as shown below:

Column 20,
Lines 5, 7 and 16, delete "150-160" and insert -- 152-160 --.

Signed and Sealed this

Twenty-seventh Day of December, 2005

JON W. DUDAS
*Director of the United States Patent and Trademark Office*